US008821288B2

(12) United States Patent
Shimono

(10) Patent No.: US 8,821,288 B2
(45) Date of Patent: Sep. 2, 2014

(54) METHOD OF DETERMINING GIFTS OF EACH FRIEND USER

(75) Inventor: Masataka Shimono, Fujisawa (JP)

(73) Assignee: Namco Bandai Games Inc., Tokyo (JP)

( * ) Notice: Subject to any disclaimer, the term of this patent is extended or adjusted under 35 U.S.C. 154(b) by 287 days.

(21) Appl. No.: 12/954,743

(22) Filed: Nov. 26, 2010

(65) Prior Publication Data

US 2011/0124415 A1    May 26, 2011

(30) Foreign Application Priority Data

Nov. 25, 2009 (JP) ................................. 2009-267418

(51) Int. Cl.
*A63F 13/00* (2014.01)
*A63F 13/12* (2006.01)

(52) U.S. Cl.
CPC ........... *A63F 13/12* (2013.01); *A63F 2300/407* (2013.01); *A63F 2300/572* (2013.01); *A63F 2300/807* (2013.01); *A63F 2300/204* (2013.01); *A63F 2300/558* (2013.01); *A63F 2300/575* (2013.01); *A63F 2300/556* (2013.01); *A63F 2300/5533* (2013.01)
USPC ................... 463/42; 463/16; 463/40; 463/41

(58) Field of Classification Search
USPC ........................................................ 463/40–42
See application file for complete search history.

(56) References Cited

U.S. PATENT DOCUMENTS

| | | | |
|---|---|---|---|
| 6,764,402 B2 * | 7/2004 | Tajiri et al. ...................... | 463/43 |
| 2002/0160838 A1 * | 10/2002 | Kim ................................ | 463/42 |
| 2005/0143174 A1 * | 6/2005 | Goldman et al. ............... | 463/42 |
| 2005/0148390 A1 * | 7/2005 | Murase et al. .................. | 463/40 |
| 2008/0182664 A1 * | 7/2008 | Kaplan et al. ................... | 463/42 |
| 2009/0204908 A1 * | 8/2009 | Ganz et al. ..................... | 715/757 |

FOREIGN PATENT DOCUMENTS

JP    A-2001-129240    5/2001

* cited by examiner

*Primary Examiner* — Justin Myhr
(74) *Attorney, Agent, or Firm* — Oliff PLC

(57) ABSTRACT

A preferential winning item that has a high selection probability is set to each user from candidate items 14a to 14e of an event. The preferential winning item is set so that the type of the preferential winning item differs between a reference user 2a and friend users 2b to 2e of the reference user 2a. The type of item that is given to each user as a result of playing an event thus differs between each user. Each user can easily acquire a plurality of preferential winning items, but cannot easily acquire a non-preferential winning item. This urges each user to give an item to another user as a present.

10 Claims, 24 Drawing Sheets

FIG. 8
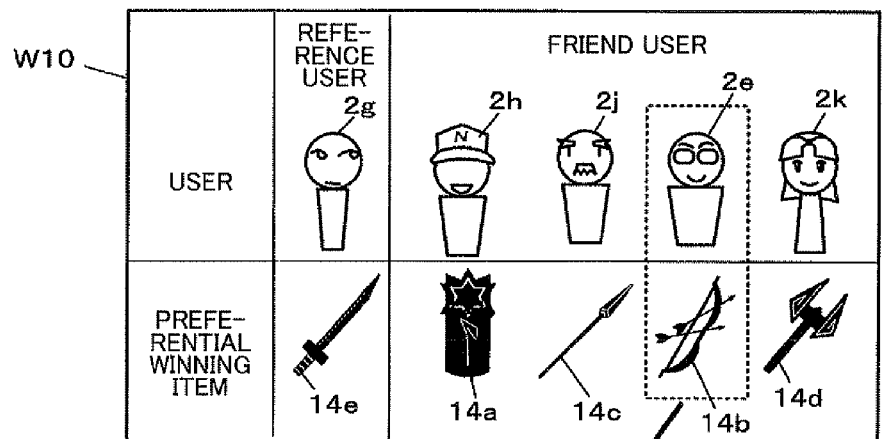
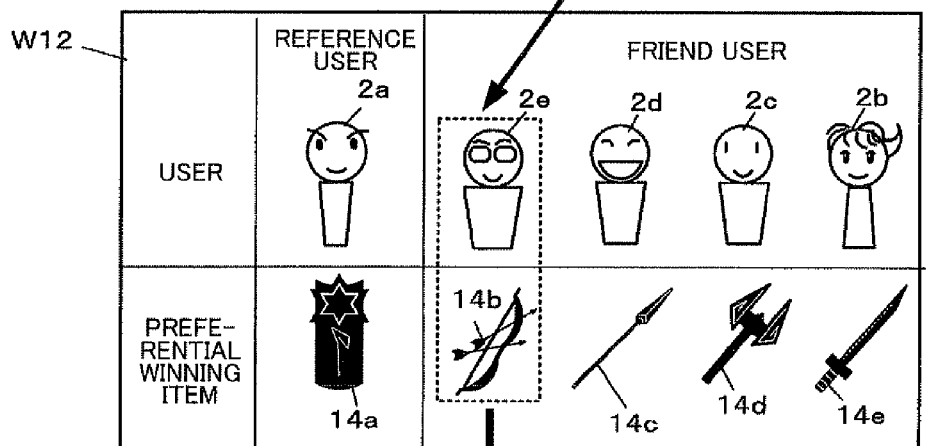
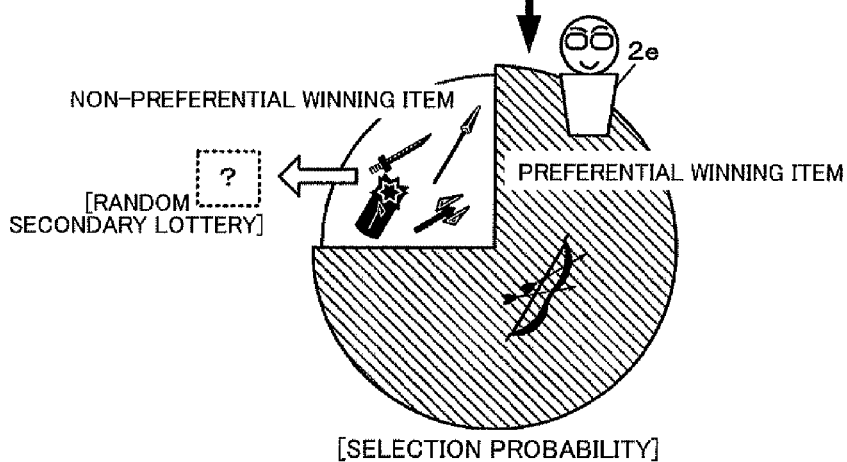

FIG. 22

| | CANDIDATE ITEM SETTING DATA | | | | | |
|---|---|---|---|---|---|---|
| | | PARAMETER CHANGE SETTING 720e | | | | |
| | ITEM ID | ARMORED SOLDIER | ASSAULT SOLDIER | HORSE SOLDIER | SNIPER | ... |
| | BLACK SHIELD | DEFENSE+50 | O | O | O | ... |
| | LIGHTNING BOW | O | O | O | OFFENSE+40 | ... |
| | FROZEN HALBERD | O | OFFENSE+5 | OFFENSE+35 | O | ... |
| | FLAMING AXE | OFFENSE+15 | O | OFFENSE+5 | O | ... |
| | VACUUM SWORD | O | OFFENSE+30 | OFFENSE+10 | O | ... |
| | ⋮ | ⋮ | ⋮ | ⋮ | ⋮ | ⋮ |

720 — CANDIDATE ITEM SETTING DATA
720b — ITEM ID
720e — PARAMETER CHANGE SETTING

METHOD OF DETERMINING GIFTS OF EACH FRIEND USER

Japanese Patent Application No. 2009-267418 filed on Nov. 25, 2009, is hereby incorporated by reference in its entirety.

BACKGROUND

A role-playing game (RPG), an action game, or the like normally allows the user (player) to acquire an item that appears in the game, and enjoy playing the game using the acquired item. An online game or the like that has a present (gift) function that allows the user to give his item to another user as a present, and thus promotes communication between the users, has also been known (see JP-A-2001-129240, for example).

When the user possesses a plurality of identical items, the user would willingly give one of the items to another user. However, when the user possesses only one item of identical type, the user is reluctant to give the item to another user. When an item given to the user is randomly selected, the user may possess only one item of each type, or each user may possess items of identical type. This hinders communication between the users utilizing the item present function.

SUMMARY

According to one aspect of the present invention, there is provided an item management method that is implemented by a server system connected to a terminal device via a communication line, the terminal device allowing a user to play a game, the item management method comprising:

selecting a giving item of each user, the giving item being used in the game;

giving the selected giving item to each user;

registering a friend user of each user; and transferring the giving item between a given user and the friend user of the given user in response to an item transfer request from the terminal device or a user terminal.

According to another aspect of the present invention, there is provided a server system connected to a terminal device via a communication line, the terminal device allowing a user to play a game, the server system comprising:

a giving item selection section that selects a giving item of each user, the giving item being used in the game;

an item-giving section that gives the selected giving item to each user;

a friend registration section that registers a friend user of each user; and an item transfer section that transfers the giving item between a given user and the friend user of the given user in response to an item transfer request from the terminal device or a user terminal.

BRIEF DESCRIPTION OF THE DRAWINGS

FIG. 8 is a schematic view illustrative of an example of using the existing preferential winning item setting.

FIG. 22 is a view showing the data configuration of candidate item setting data according to a modification.

DESCRIPTION OF EXEMPLARY EMBODIMENTS

Figure 1:
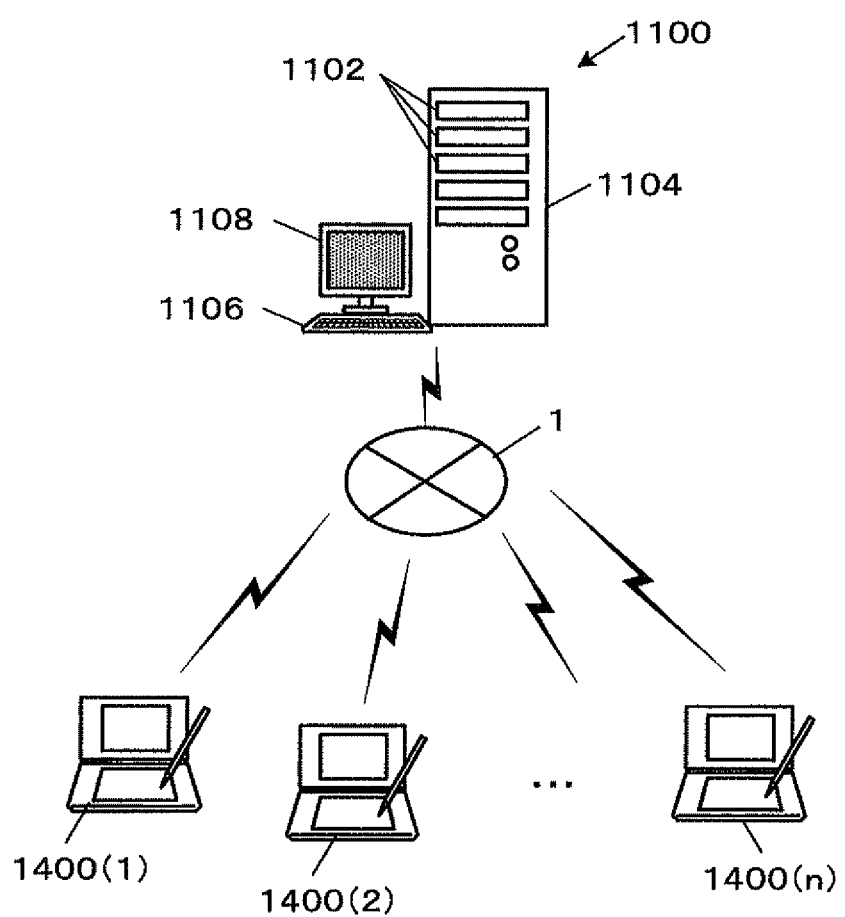
FIG. 1 is a view showing a system configuration example that implements an online game.

Several embodiments of the invention may promote communication between users by more reliably urging each user to give an item to another user as a present.

According to one embodiment of the present invention, there is provided an item management method that is implemented by a server system connected to a terminal device via a communication line, the terminal device allowing a user to play a game, the item management method comprising:

selecting a giving item of each user, the giving item being used in the game;

giving the selected giving item to each user;

registering a friend user of each user; and transferring the giving item between a given user and the friend user of the given user in response to an item transfer request from the terminal device or a user terminal.

According to another embodiment of the present invention, there is provided a server system connected to a terminal device via a communication line, the terminal device allowing a user to play a game, the server system comprising:

a giving item selection section that selects a giving item of each user, the giving item being used in the game;

an item-giving section that gives the selected giving item to each user;

a friend registration section that registers a friend user of each user; and an item transfer section that transfers the giving item between a given user and the friend user of the given user in response to an item transfer request from the terminal device or a user terminal.

According to the above configuration, the type of item given to each user differs between each user. Specifically, each user can acquire an item selected for each user. Therefore, when each user desires to acquire another item, each user must exchange information with another user (friend user) who has been registered as a friend, and exchange items by utilizing the item transfer function (item present function). This promotes communication between the users by urging each user to give an item to another user as a present.

In the item management method, the selecting of the giving item may include selecting the giving item so that the type of the giving item differs between a given user and the friend user of the given user.

According to the above configuration, the type of item given to each user differs between a given user and each friend user of the given user. Specifically, it is likely that the friend user of the given user possesses an item that cannot be easily acquired by the given user, and the type of item differs between each friend user.

Therefore, since each user can acquire the desired item by communicating with the friend user instead of communicating with an unknown user, it is possible to reduce a psychological communication barrier, or urge each user to communicate with another user. This further promotes communication between the users by urging each user to give an item to another user as a present.

The item management method may further comprise:

changing a degree of friendship of each friend user of a given user with the given user based on a process of the game, and the selecting of the giving item may include selecting the giving item so that the type of the giving item differs between the given user and each friend user of the given user having a degree of friendship within a given range.

According to the above configuration, the type of item given to each user differs between a given user and each friend user of the given user. An item is selected so that the type of item differs between the friend users having a degree of friendship within a given range. Specifically, it is likely that the friend user of the given user having a degree of friendship within a given range possesses an item that cannot be easily acquired by the given user, and the type of item differs between each friend user having a degree of friendship within a given range.

Specifically, it is likely that each user can relatively quickly acquire the desired item by communicating with a friend user having a high degree of friendship. This makes it possible to further reduce a psychological communication barrier, or further urge each user to communicate with another user. This further promotes communication between the users by urging each user to give an item to another user as a present.

The item management method may further comprise:

changing a degree of friendship of each friend user of a given user with the given user based on a process of the game; and setting a priority to each giving item, and the selecting of the giving item may include selecting the giving item of each friend user of the given user based on the degree of friendship of each friend user with the given user and the priority of each giving item.

According to the above configuration, the type of item given to each user differs between a given user and each friend user of the given user. An item is selected based on priority so that the type of item differs between the friend users having a degree of friendship within a given range. The term "priority" used herein refers to the degree of rareness or the degree of importance determined in advance by the game manufacturer, or the degree of effectiveness on each character determined based on the ability setting of each item, or the like.

It is likely that the friend user of a given user having a degree of friendship within a given range possesses an item that cannot be easily acquired by the given user, and the friend user having a degree of friendship within a given range possesses an item selected based on priority. Specifically, it is likely that each user can relatively quickly acquire the desired item by communicating with a friend user having a high degree of friendship. This makes it possible to reduce a psychological communication barrier, or urge each user to communicate with another user. This promotes communication between the users by urging each user to give an item to another user as a present.

The item management method may further comprise:

performing a given communication control process for communication between users; and storing a history of communication between users through the communication control process, and the changing of the degree of friendship may include changing the degree of friendship of each friend user of the given user with the given user using the history of communication between the given user and each friend user of the given user.

According to the above configuration, since the degree of friendship of the friend user can be determined based on the actual history of communication, the degree of friendship can be set in line with the current friendship.

The item management method may further comprise:

selecting a preferential item of each user, the preferential item being selected as the giving item with a high probability; and selecting an item that has been selected by a lottery process as the giving item of each user, the lottery process selecting an item so that the preferential item is selected with a high probability as compared with other items.

According to the above configuration, the preferential item of each user is selected with a high probability as compared with other items. Therefore, each user can easily acquire a plurality of preferential items, and may willingly give the preferential item to another user. This makes it possible to promote communication between the users by further urging each user to give an item to another user as a present.

In the item management method, the selecting of the preferential item may include selecting the preferential item so that the type of the preferential item differs between a given user and each friend user of the given user, and the method may further comprise selecting the giving item by performing a primary lottery process that determines whether or not to select the giving item from the preferential items selected for each user, and a secondary lottery process that selects the giving item from items determined based on a result of the primary lottery process.

According to the above configuration, since the number of types of items that can be given to another user increases, it is possible to promote communication between the users by further urging each user to give an item to another user as a present.

Exemplary embodiments to which the invention is applied are described below taking an example of a server system for an online game that allows a plurality of users to enjoy the game in a common virtual world. Note that embodiments to which the invention may be applied are not limited to the following exemplary embodiments.

The term "online game" used herein includes a dedicated online game that allows the users to share the game process in real time (e.g., massively multiplayer online role-playing game (MMORPG)), and a game that requires an authentication process or a save data transmission/reception process to be performed online, but does not necessarily require the game process to be performed online.

FIG. 1 is a view showing a system configuration example that implements an online game according to one embodiment of the invention. The online game according to this embodiment is implemented by a system that includes a plurality of portable game devices 1400 (1400(1) to 1400(n) in FIG. 1 (n is a natural number)) that are connected via a communication line 1, and a server system 1100.

The communication line 1 is a communication channel through which data can be exchanged. Specifically, the term "communication line" includes a communication network such as a local area network (LAN) using a private line (private cable) for direct connection, Ethernet (registered trademark), and the like, a telecommunication network, a cable network, and the Internet. The communication method may be a cable communication method or a wireless communication method.

The server system 1100 includes a housing 1104 that includes a plurality of blade servers 1102. The server system 1100 also includes a keyboard 1106 and a display monitor 1108 that are used to operate (manage) the blade servers 1102. The blade servers 1102 provide a CPU, an I/O module, an IC memory, a storage (e.g., hard disk), and the like, and function as a single server computer. The housing 1104 includes the blade servers 1102, a power supply module that supplies power to the blade servers 1102, a communication device that connects to the communication line 1, and the like.

Note that the server system 1100 may be implemented by a single server computer.

The server system 1100 is a computer that implements a user registration/account acquisition function, a user authentication process (login process), a multi-play lobby function, and a user communication function (e.g., chat, gift, and message board).

The portable game device 1400 is an electronic device that serves as a client machine (terminal) with respect to the server system 1100. Each user basically plays the game using one portable game device 1400. The portable game device 1400 is a computer that exchanges data with the server system 1100 or another portable game device 1400 via the communication line 1, and can execute an application program downloaded from the server system 1100. Note that a personal computer, a consumer game device, an arcade game device, a mobile phone that can execute an application program, or the like may be used as the client machine instead of the portable game device 1400.

Figure 2:
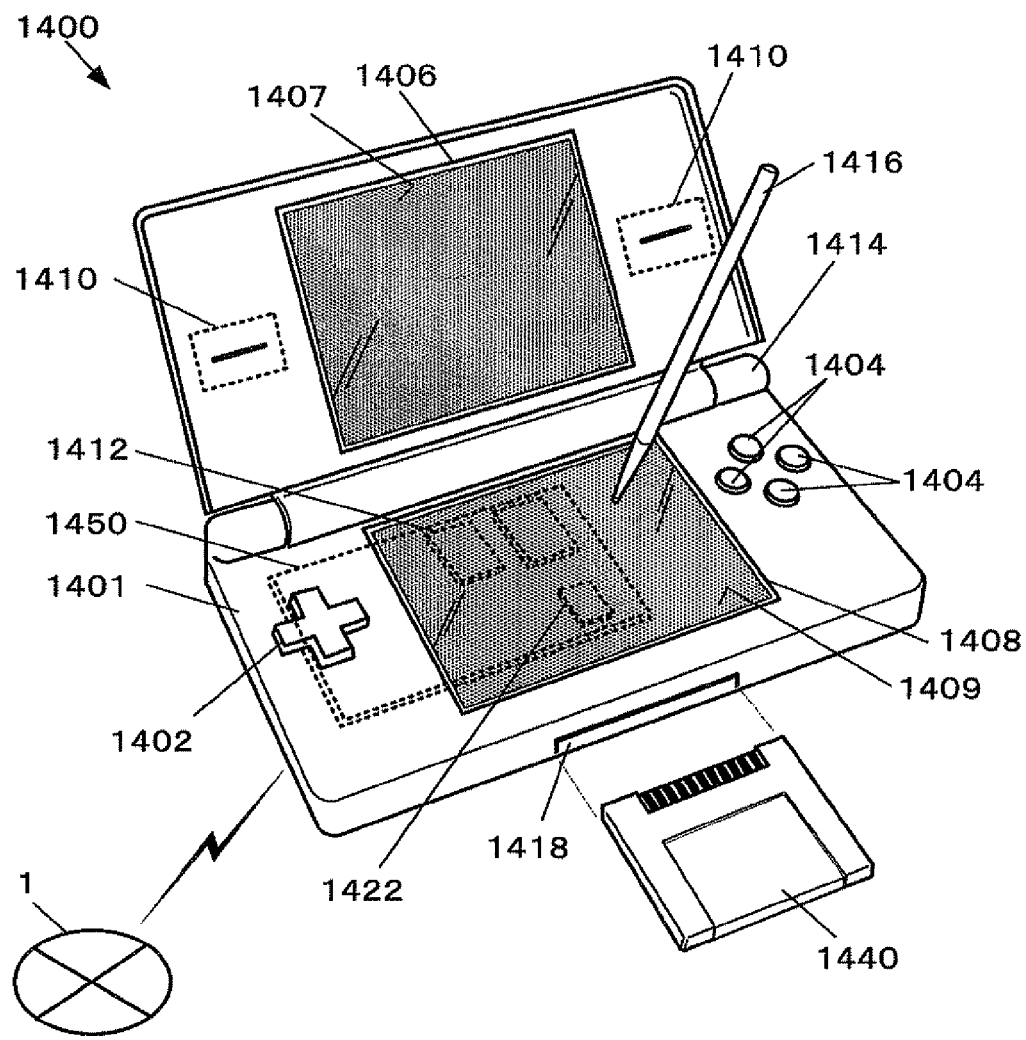
FIG. 2 is an external view illustrative of a configuration example of a portable game device.

FIG. 2 is an external view illustrative of a configuration example of the portable game device 1400. The portable game device 1400 includes an arrow key 1402, button switches 1404, a first liquid crystal display 1406, a second liquid crystal display 1408, a speaker 1410, a control unit 1450, and a flip-top main body 1401 that can be opened and closed through a hinge 1414, the arrow key 1402, the button switches 1404, the first liquid crystal display 1406, the second liquid crystal display 1408, the speaker 1410, and the control unit 1450 being provided on or in the main body 1401. Touch panels 1407 and 1409 that allow the user to perform a touch operation by touching an arbitrary position within the display screen using a stylus pen 1416 or the like are provided on the display screens of the first liquid crystal display 1406 and the second liquid crystal display 1408, respectively.

The main body 1401 includes a memory card reader 1418 that reads and writes data from and into a memory card 1440 (i.e., computer-readable information storage medium). The memory card 1440 stores a program and setting data necessary for the control unit 1450 of the portable game device 1400 to execute various game calculation processes. The main body 1401 is also provided with a built-in battery, a power button, a volume control button, and the like (not shown).

The touch panels 1407 and 1409 respectively cover almost the entire area of the display screens of the first liquid crystal display 1406 and the second liquid crystal display 1408 so that images displayed on the first liquid crystal display 1406 and the second liquid crystal display 1408 can be observed from the outside. When the player has performed a touch operation using the stylus pen 1416 (or a finger or the like), the coordinates of the touch position in an orthogonal coordinate system (origin: upper left) can be output to the control unit 1450.

The control unit 1450 corresponds to a game device control board, and includes a processor (e.g., central processing unit (CPU), graphics processing unit (GPU), and digital signal processor (DSP)), an application-specific integrated circuit (ASIC), and an IC memory 1422 (e.g., VRAM, RAM, and ROM).

The control unit 1450 also includes a wireless communication module 1412, a driver circuit that drives the first liquid crystal display 1406 and the liquid crystal display 1408, a driver circuit that drives the touch panel 1407 and the touch panel 1409, a circuit that receives signals from the arrow key 1402 and the button switches 1404, an amplifier circuit that outputs a sound signal to the speaker 1410, and an interface (I/F) circuit such as a signal input-output circuit that exchanges signals with the memory card reader 1418. The elements provided in the control unit 1450 are electrically connected via a bus circuit so that data can be read from and written into the elements, or signals can be exchanged between the elements.

The control unit 1450 reads a program and data stored in the memory card 1440 via the memory card reader 1418, or downloads a program and data from the server system 1100 via the communication line 1, and temporarily stores the program and data in the IC memory. The control unit 1450 performs a calculation process by executing the program read from the IC memory, and controls each section of the portable game device 1400 (executes the game) based on operation inputs from the arrow key 1402, the button switches 1404, and the touch panels 1407 and 1409.

Note that three or more liquid crystal displays may be provided. Alternatively, a single display may be virtually divided to implement a plurality of virtual displays.

Outline of Game

Figure 3:
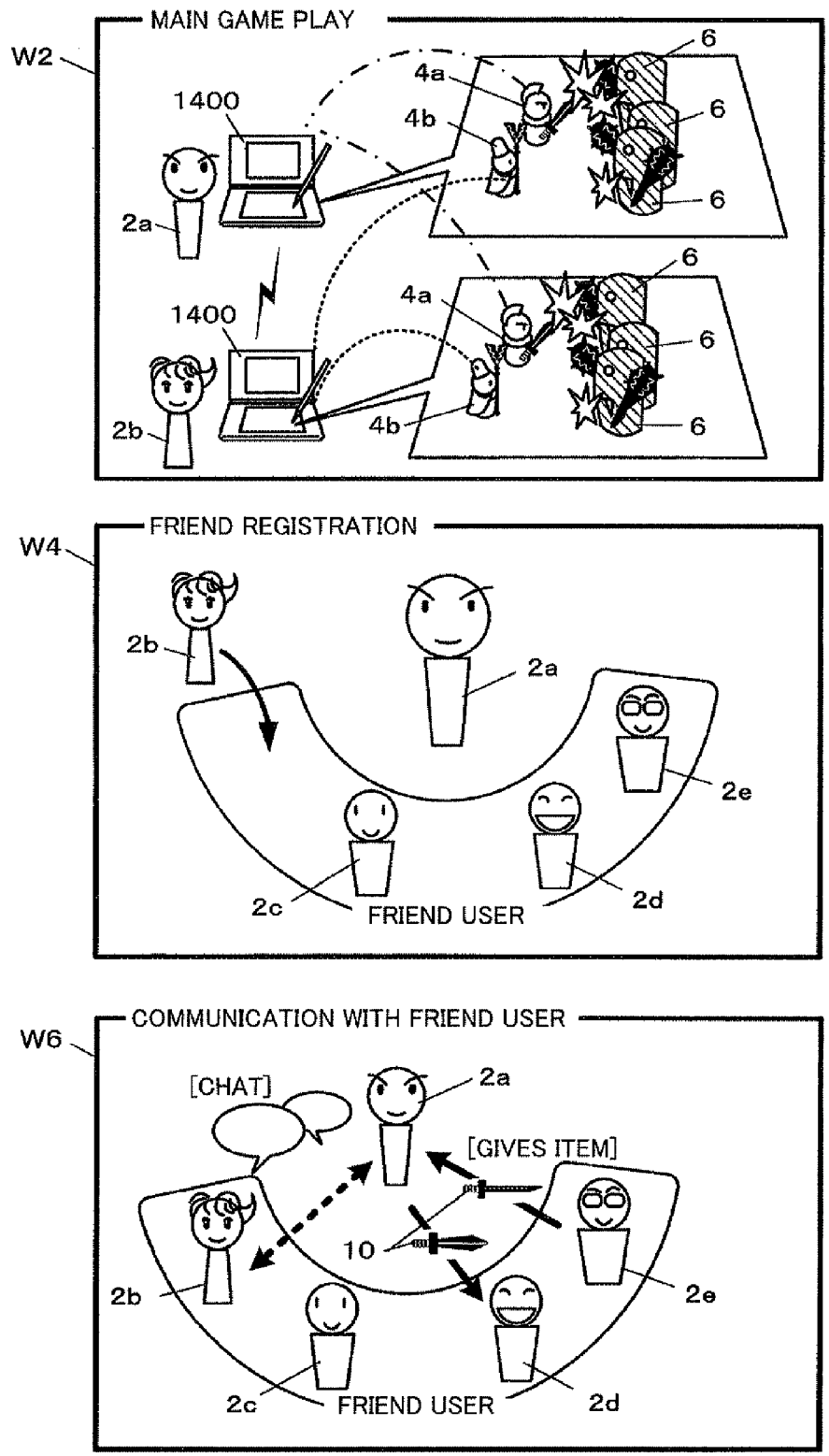
FIG. 3 is a schematic view showing functions of an online game that can be utilized by the user.
Figure 4:
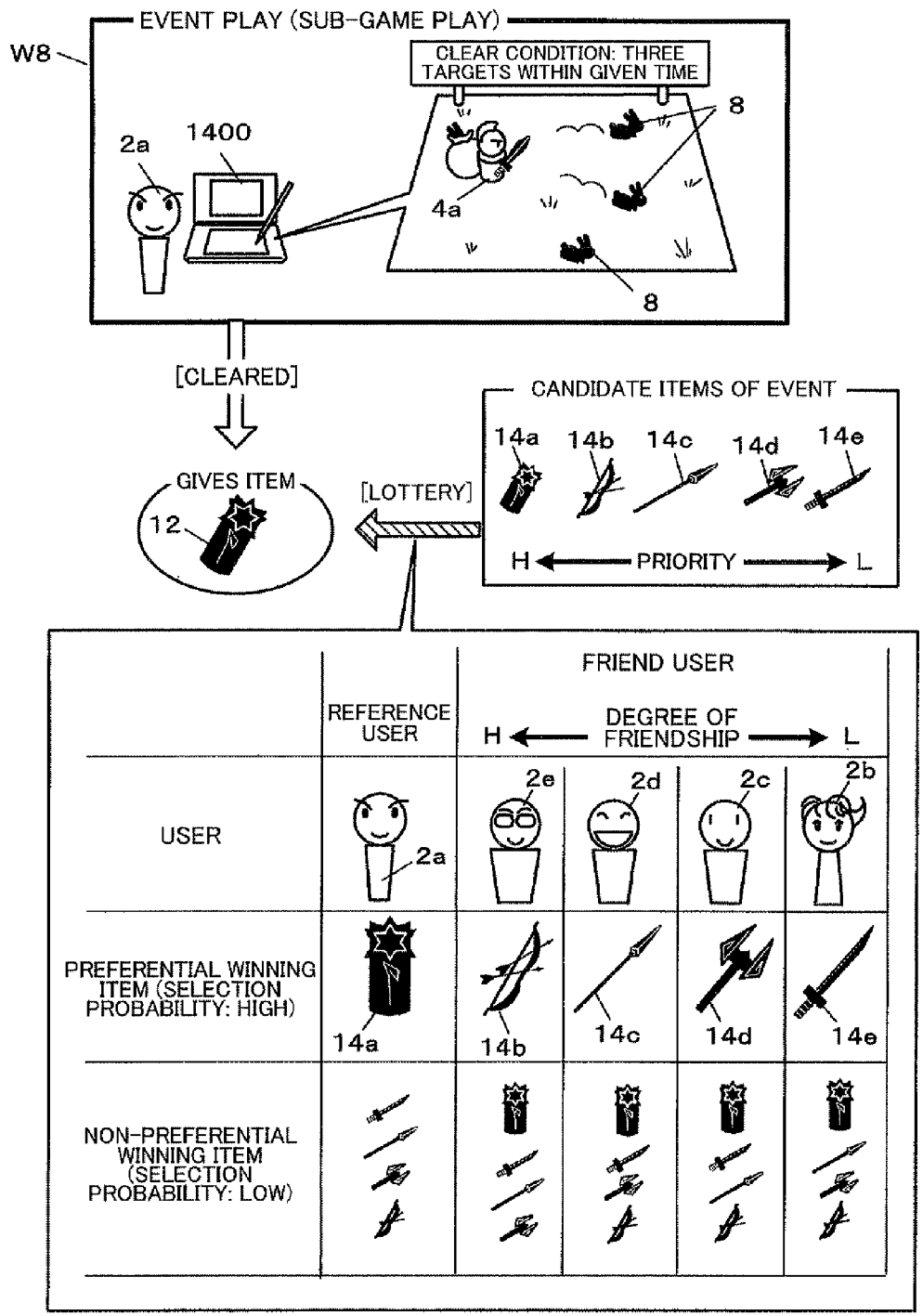
FIG. 4 is a schematic view showing functions of an online game that can be utilized by the user.

FIGS. 3 and 4 are schematic views showing functions of the online game according to this embodiment that can be utilized by the user. The user accesses the server system 1100 using the portable game device 1400, finds another user using the lobby function provided by the server system 1100, and plays a main game either alone or with the other user. The main game is an RPG that allows users 2a and 2b to respectively operate characters 4a and 4b, and fight monsters 6 in a fantastic virtual world (W2). Note that the main game is not limited to an RPG, but may be a shooting game, an adventure game, a breeding game, a flight simulation game, or the like.

The user can acquire identification information (e.g., account) from a friendly user, and register the friendly user as his friend by performing a given friend registration request operation (W4). The user thus registered as a friend is referred to as "friend user". FIG. 3 shows an example in which the user 2a registers the user 2b who has played the game with the user 2a as a new friend user.

The user 2a can communicate with the friend users 2b to 2e by chatting with the friend users 2b to 2e, or presenting the friend users 2b to 2e with an item 10 that is used in the game (W6). The term "present" used herein refers to transferring an item possessed by the user, and includes transferring original ownership or a replica.

As shown in FIG. 4, the user can play a sub-game (i.e., limited time event) in addition to the main game (W8). FIG. 4 shows an example of the sub-game in which the user 2a captures a given number of targets 8 within a given time using the character 4a in a given hunting field provided in the game world. Note that the event is not limited to the sub-game, but may be cherry blossom viewing, eclipse observation, a theatrical show (e.g., NPC), a given movie, or the like in the game world.

An item is given to the user 2a as an event play benefit during or after the event. The item (winning item 12) (i.e., giving item) given to the user 2a is selected by a lottery from candidate items 14 that are provided in advance corresponding to each event. In the example shown in FIG. 4, a shield 14a, a bow 14b, a halberd 14c, an axe 14d, and a sword 14e are provided in advance as the candidate items. A priority parameter value has been set to each candidate item in descending order from the shield 14a to the sword 14e.

A known game is designed so that one of the candidate items 14a to 14e is selected by a lottery based on a given selection probability (synonymous with win probability) of each item irrespective of the user who has played the event. Therefore, the item given to the user is selected at random. When a rare item is included in the candidate items 14, the selection probability of the rare item may be set to a low value.

In this embodiment, however, the selection probability of each item (excluding a rare item) selected as the winning item 12 by a lottery differs between the users. Specifically, a different item is likely to be selected for each user.

For example, when a reference user 2a has played the event for the first time, one of the candidate items 14a to 14e is selected, and classified/set as a preferential winning item of the reference user 2a (i.e., the shield 14a in the example shown in FIG. 4). The remaining items (i.e., the bow 14b, the halberd 14c, the axe 14d, and the sword 14e in the example shown in FIG. 4) are classified as a non-preferential winning item.

Figure 5:
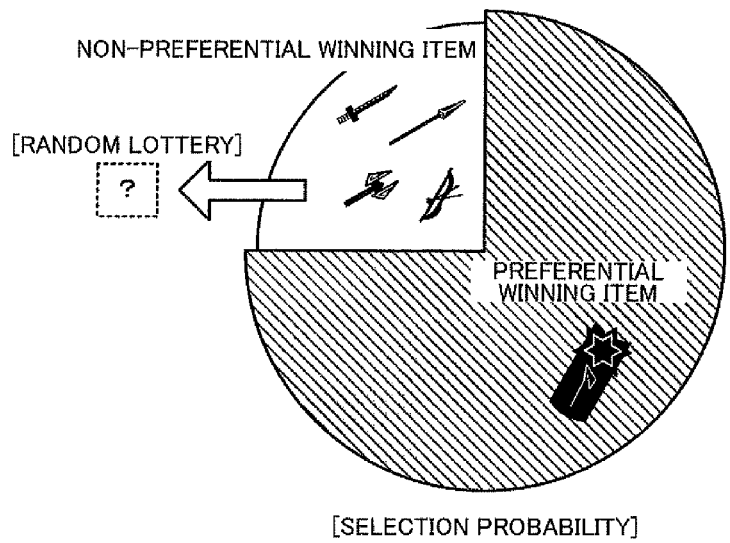
FIG. 5 is a view illustrative of the selection probability of a preferential winning item.

The selection probability of the preferential winning item is set to be higher than that of the non-preferential winning item. As shown in FIG. 5, the selection probability of the preferential winning item is set to 75%, and the selection probability of the non-preferential winning item is set to 25%, for example. In the example shown in FIG. 5, since the number of non-preferential winning items is four, the probability that each non-preferential winning item is selected as the winning item is 1/16 (=¼th of 25%). Note that the selection probability may be appropriately set insofar as the selection probability of the preferential winning item is higher than that of the non-preferential winning item. The selection probability of the preferential winning item may be set to 100%.

The preferential winning item is also similarly set to each of the friend users 2b to 2e of the reference user 2a from the candidate items (see FIG. 4). In this case, the preferential winning item is set so that the type of preferential winning item differs between the reference user 2a and the friend users 2b to 2e. Specifically, the preferential winning item is set so that the type of preferential winning item selected for each user differs between a given user and a registered friend user of the given user.

More specifically, the degree of friendship of each of the friend users 2b to 2e is calculated, and one of the candidate items excluding the preferential winning item of the reference user 2a is set as the preferential winning item of each friend user based on the degree of friendship. The preferential winning item is set so that the type of preferential winning item differs between the friend users having a degree of friendship within a given range. The candidate items other than the preferential winning item of each friend user are classified as the non-preferential winning item.

The term "degree of friendship" refers to a parameter value that indicates the degree of familiarity of the friend user with respect to the reference user 2a. The degree of friendship according to this embodiment is calculated by a given function f(N, t) based on a communication count N (e.g., chat count, game play count, and present exchange count) with the friend user and an elapsed time t from the preceding communication with the friend user. The degree of friendship is indicated by a value within the range of 0 to 100.

Figure 6:
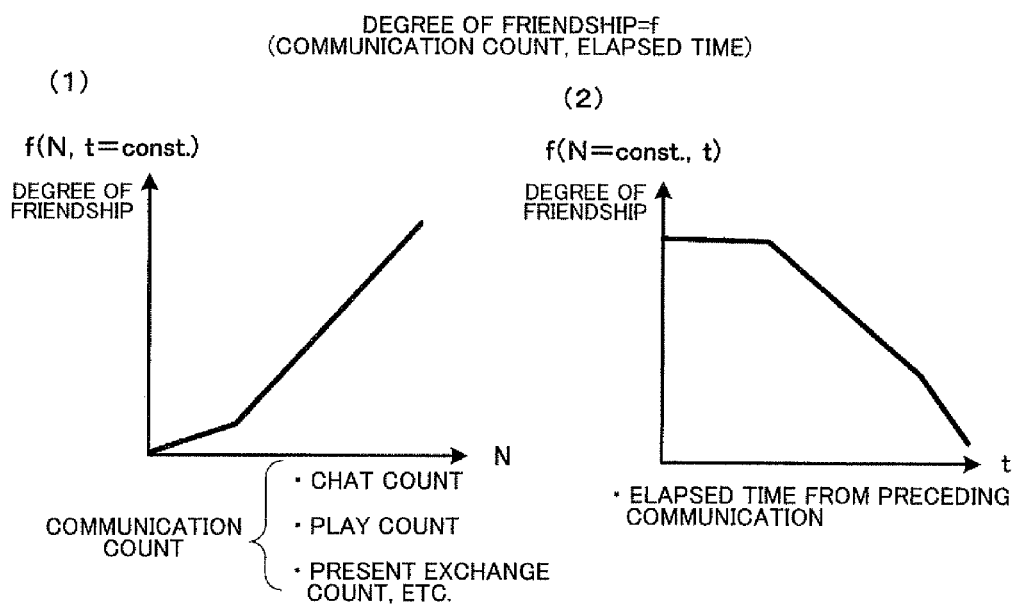
FIG. 6 is a view illustrative of a degree of friendship calculation function.

As shown in FIG. 6(1), the function f(N, t) is calculated so that the degree of friendship increases as the communication count N (e.g., chat count, game play count, and present exchange count) with the friend user increases. As shown in FIG. 6(2), the function f(N, t) is calculated so that the degree of friendship increases as the elapsed time t from the preceding communication with the friend user decreases. Specifically, a friend user who more frequently communicates with the reference user 2a is considered to be more friendly with the reference user 2a. The variables of the function f may be acquired from the play record of the user, the access log, or the like.

Note that the variables of the function f are not limited to the communication count N and the elapsed time t, but may be a rank that indicates the skill of the friend user, an experience value of a character used by the friend user, the total number of items possessed by the friend user, and the like.

Figure 7:
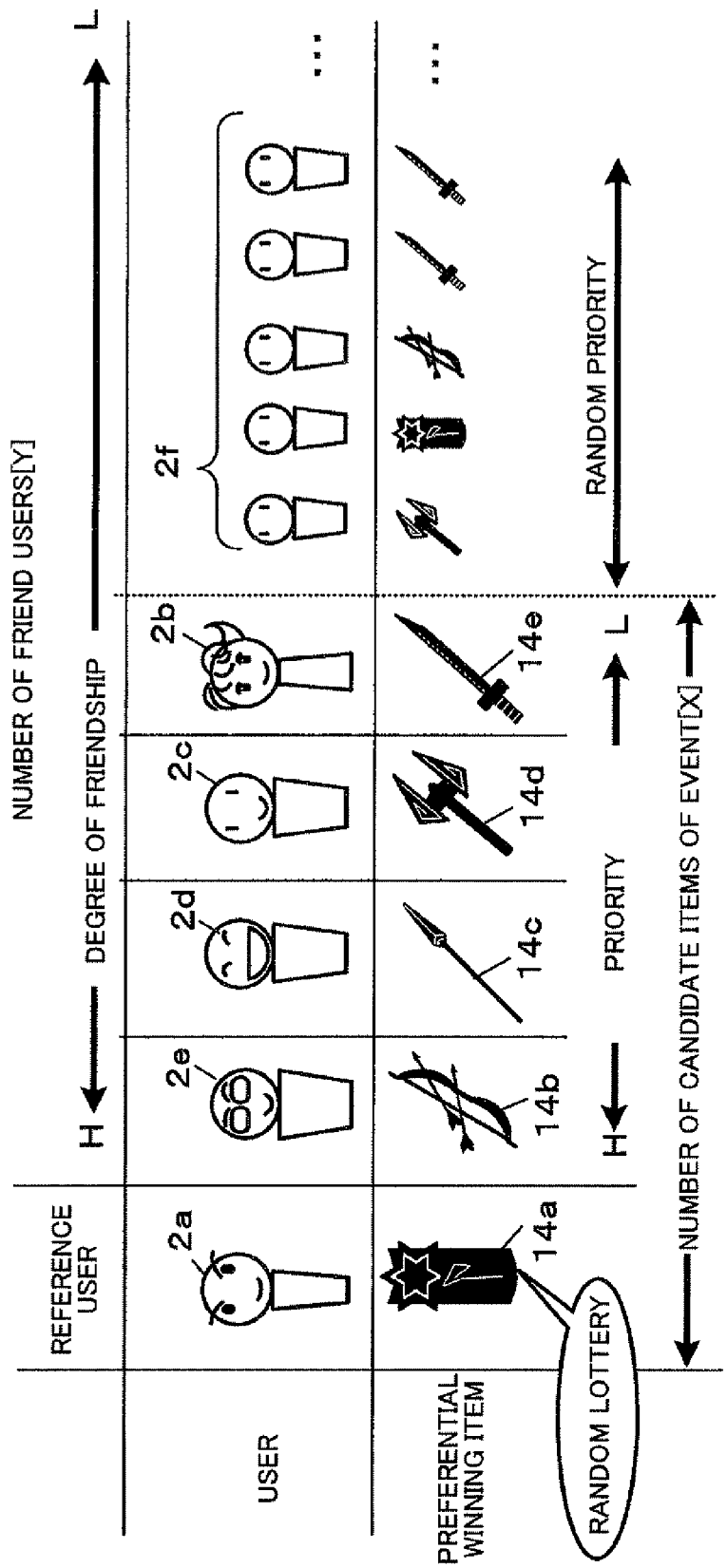
FIG. 7 is a view showing an example of a preferential winning item setting method when the number Y of friend users is larger than the number X of candidate items of an event.

As shown in FIG. 7, when the number Y of friend users of the reference users 2a is larger than the number X of candidate items of the event, the preferential winning items of friend users 2f exceeding the number X of candidate items may be selected by a random lottery from the candidate items. Alternatively, the preferential winning items of the friend users 2f may be selected based on the degree of friendship.

The random lottery is implemented by branching the lottery result based on whether or not random numbers generated by a random number generation process satisfy a given winning condition, and corresponds to a known lottery process using random numbers that is designed so that the selection probability of each lottery candidate is at least apparently identical.

As shown in FIG. 8, when the friend user (e.g., friend user 2e) of the reference user 2a is also a friend user of another reference user 2g, and the preferential winning item (14b) has been set to the friend user 2e when determining the preferential winning item of the reference user 2g (W10), the existing setting is used when setting the preferential winning item in the community of the reference user 2a (W12).

According to this embodiment, since the type of item acquired by the reference user 2a who has played the event is biased, the reference user 2a is likely to acquire the same type of item each time the reference user 2a plays the event. On the other hand, since the preferential winning items of the friend users 2b to 2e of the reference user 2a are items that cannot be easily acquired by the reference user 2a, the friend users 2b to 2e are likely to possess items desired by the reference user 2a. This also applies to each of the friend users 2b to 2e.

Therefore, when the reference user 2a desires to acquire all of the items that can be acquired as a result of playing the event, or desires to acquire an item that has not been acquired by the reference user 2a, the reference user 2a can quickly attain his aim by asking the friend users 2b to 2e to hand over the desired item in exchange for the item that is not possessed by the friend users 2b to 2e rather than repeatedly playing the same event. This also applies to each of the friend users 2b to 2e of the reference user 2a. Specifically, it is possible to promote communication between the users by promoting exchange of information about the items acquired by the friend users or exchange of the items.

Functional Blocks of Server System

Figure 9:
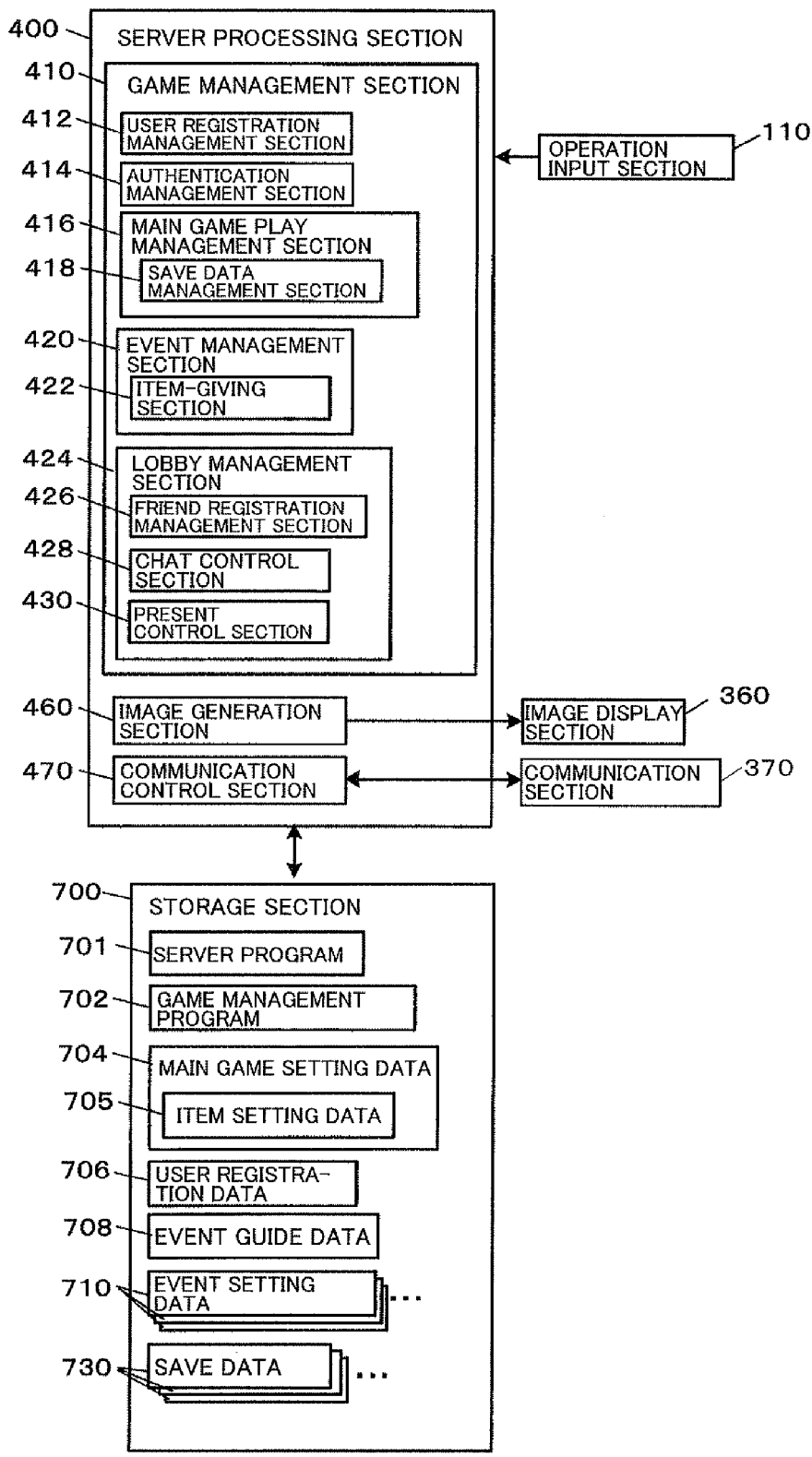
FIG. 9 is a functional block diagram showing an example of the functional configuration of a server system.

FIG. 9 is a functional block diagram showing an example of the functional configuration of the server system 1100 according to this embodiment. The server system 1100 is a computer system that includes an operation input section 110, a server processing section 400, an image display section 360, a communication section 370, and a storage section 700.

The operation input section 110 is implemented by a keyboard, a button switch, a joystick, a touch pad, a trackball, or the like. The operation input section 110 outputs an operation input signal to the server processing section 400 based on an operation input performed by the server administrator. In FIG. 1, the keyboard 1106 corresponds to the operation input section 110.

The server processing section 400 is implemented by electronic components such as a processor (e.g., microprocessor), an application-specific integrated circuit (ASIC), and an IC memory. The server processing section 400 exchanges data with each functional section (e.g., operation input section 110 and storage section 700) of the server system 1100. The server processing section 400 controls the operation of the server system 1100 by performing a calculation process based on a given program, data, and the operation input signal input from the operation input section 110.

The server processing section 400 includes a user registration management section 412, an authentication management section 414, a main game play management section 416, an event management section 420, and a lobby management section 424, for example.

The user registration management section 412 performs a new user registration process that receives a newly registered user, and assigns a new account to the newly registered user. Information about the registered user is stored in the storage section 700 as user registration data 706. The user registration data 706 includes information similar to the user registration information used in a known online game.

The authentication management section 414 performs a user authentication (login) management process that allows the user to play the main game or the event, or utilize a user communication function. The function of the authentication management section 414 may be implemented in the same manner as authentication management in a known online game.

The main game play management section 416 performs a main game play process. For example, the main game play management section 416 transmits virtual space (game stage (scene)) setting data and NPC setting data to the portable game device 1400 that has transmitted a main game play request, and performs an NPC/game world automatic operation management process. These functions may be implemented in the same manner as in a known online game. The main game play management section 416 includes a save data management section 418, and stores and manages main game play result information in the storage section 700 as user save data 730.

The event management section 420 performs an event execution process. In this embodiment, the event management section 420 allows the user to play the sub-game as the event for a limited time. Specifically, when the portable game device 1400 has transmitted an event participation request, the event management section 420 transmits a special program and data that enable the user of the portable game device 1400 to play the desired event to the portable game device 1400. Note that the event management section 420 need not transmit a special program when the event is a meeting, a viewing program, or the like in the game world of the main game instead of the sub-game. The process performed by the event management section 420 may be appropriately set depending on the type of the online game.

The event management section 420 includes an item-giving section 422 that gives an item to the user when the user has played the event.

The item-giving section 422 performs a preferential winning item setting process, a process that selects an item (winning item 12) given to the user based on the preferential winning item setting, and a process that adds the winning item to the items possessed by the user who has played the event.

The lobby management section 424 performs a process that implements a lobby where the users who have logged in arbitrarily gather and communicate with other users (i.e., lobby function). The lobby management section 424 includes a friend registration management section 426, a chat control section 428, and a present control section 430 as user communication functions.

The friend registration management section 426 receives a given friend registration request from the portable game device 1400 of the user, and registers and manages the user designated by the friend registration request as a friend user.

The chat control section 428 implements a chat function between the users. The type of chat may be appropriately set (e.g., text chat or voice chat).

The present control section 430 implements an item present function between the users. The item present function is implemented by a similar function (e.g., gift function or present function) used in a known online game, and includes a function of adding an item given by another user to the items possessed by the user (updating the items possessed by the user).

The image generation section 460 is implemented by a processor (e.g., digital signal processor (DSP)), a control program, a drawing frame IC memory (e.g., frame buffer), and the like. The image generation section 460 generates one 3DCG image every frame time (e.g., 1/60th of a second), and outputs image signals of the generated image to the image display section 360.

The image display section 360 displays an image based on the image signals input from the image generation section 460. The image display section 360 may be implemented by an image display device such as a flat panel display, a cathode-ray tube (CRT), a projector, or a head mount display. The image display section 360 displays an operation screen when the administrator of the server system 1100 operates the server system 1100. In FIG. 1, the display monitor 1108 corresponds to the image display section 360.

The communication control section 470 performs a data communication process to exchange data with an external device via the communication section 370.

The communication section 370 connects to the communication line 1 at a physical level, and implements communication. The communication section 370 is implemented by a transceiver, a modem, a terminal adapter (TA), a jack for a communication cable, a control circuit, and the like.

The storage section 700 stores a program that causes the server processing section 400 to control the server system 1100, data, and the like. The storage section 700 is used as a work area for the server processing section 400, and temporarily stores the results of calculations performed by the server processing section 400 based on a program, data input from the operation section 110, and the like. The function of the storage section 700 is implemented by an IC memory (e.g., RAM or ROM), a magnetic disk (e.g., hard disk), an optical disk (e.g., CD-ROM or DVD), or the like.

In this embodiment, the storage section 700 stores a server program 701 that causes the server processing section 400 to implement basic server functions, a game management program 702 that causes the server processing section 400 to implement the functions of a game management section 410, main game setting data 704, event guide data 708, and event setting data 710. Since the event guide data 708 and the event setting data 710 are used for a limited time, data is appropriately added to, or changed or deleted from, the event guide data 708 and the event setting data 710.

The storage section 700 also stores user registration data 706 and save data 730 that are generated during game management, and appropriately updated. The storage section 700 may also appropriately store information (e.g., counter value, timer value, or flag) that is required for game management.

The main game setting data 704 includes setting data about various objects that appear in the game, such as model data, texture data, motion data, initial position data, and item setting data 705 about characters and the background that forms the game space (main game stage).

The item setting data 705 also includes information about the setting of an item given to the user as a result of playing the event. Therefore, the item setting data 705 is appropriately updated each time the user plays the event.

The user registration data 706 includes a user ID, and an account and a password necessary for authentication. The user registration data 706 may be implemented in the same manner as the user registration data used in a known online game.

Figure 10:
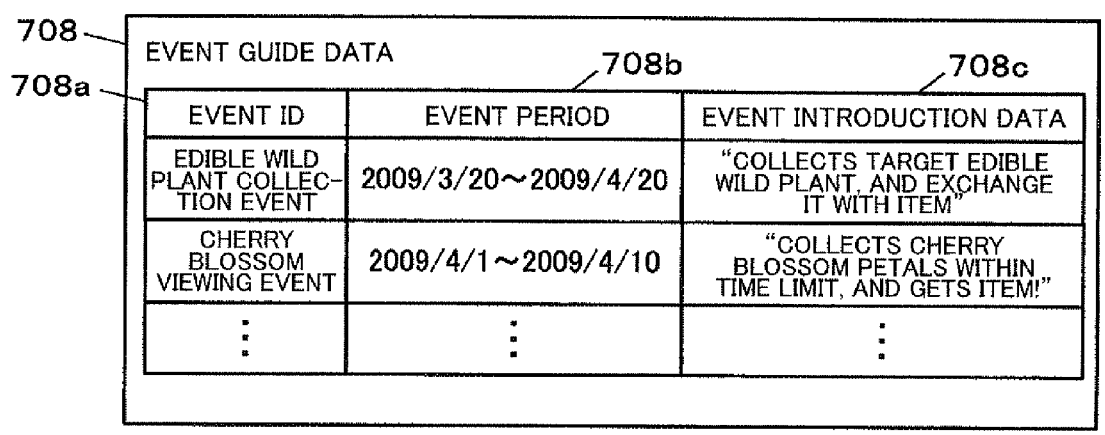
FIG. 10 is a view showing a data configuration example of event guide data.

The event guide data 708 includes information about a limited time event. As shown in FIG. 10, the event guide data 708 includes an event ID 708a, an event period 708b, and event introduction data 708c including an event outline text or the like, for example. The event guide data 708 is appropriately updated by the game administrator.

In this embodiment, the candidate items 14 (see FIG. 4) are set corresponding to each event. When it is desired to divide the event period 708b into a plurality of sub-periods (e.g., by weeks), and set a different set of candidate items 14 corresponding to each sub-period, the events in the sub-periods may be handled as a single event (e.g., edible wild plant collection event), but may be may be managed as different events (e.g., "edible wild plant collection event (first week)" and "edible wild plant collection event (second week)").

Figure 11:
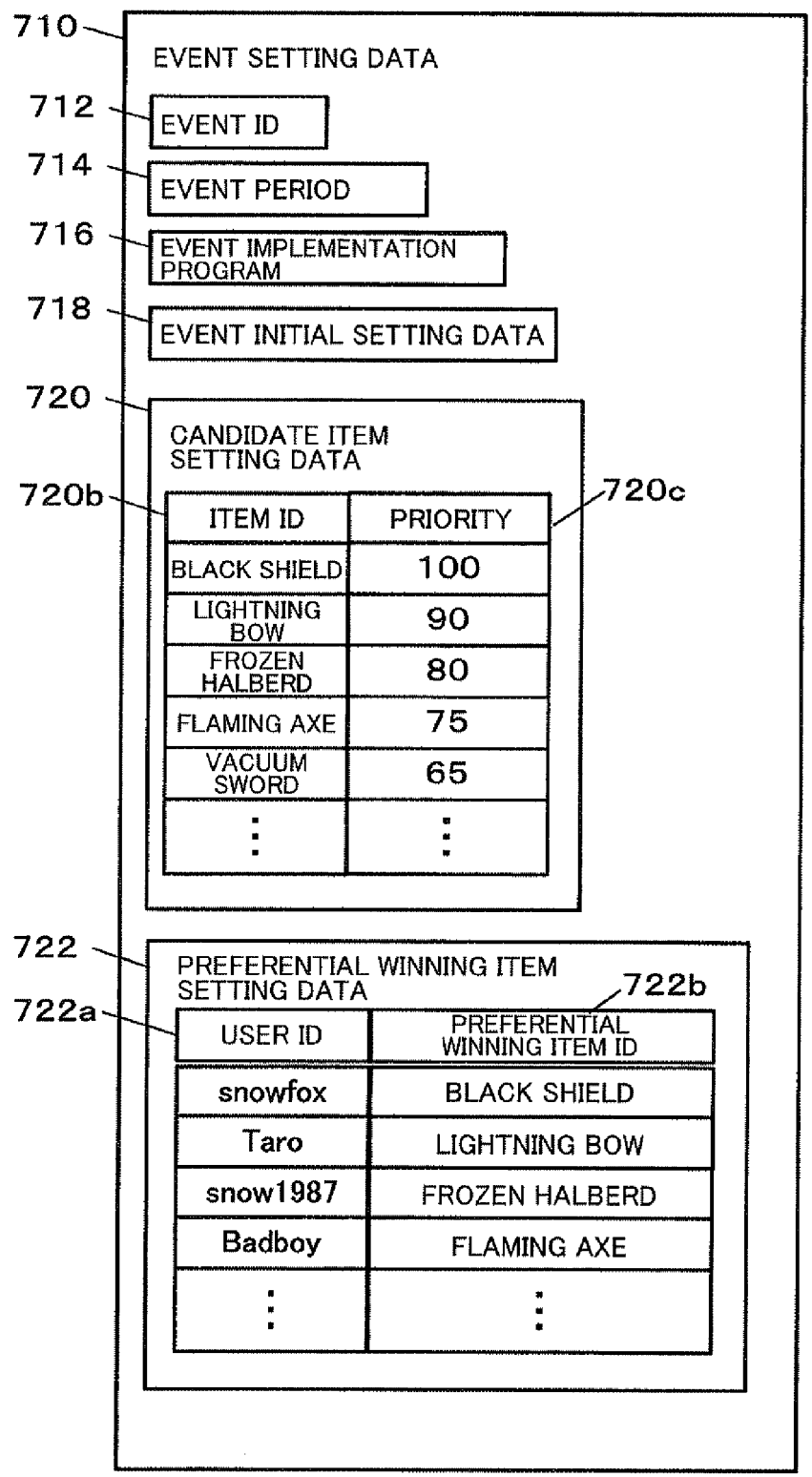
FIG. 11 is a view showing a data configuration example of event setting data.

The event setting data 710 is a data set provided corresponding to each event. As shown in FIG. 11, the event setting data 710 includes an event ID 712, an event period 714, an event implementation program 716, event initial setting data 718, candidate item setting data 720, and preferential winning item setting data 722, for example.

The event implementation program 716 is a special program that implements the sub-game as the event. The event initial setting data 718 includes setting data (e.g., model data, texture data, motion data, and position data) about objects (e.g., background and character) that appear in the sub-game.

The candidate item setting data 720 includes an item ID 720b of an item (candidate item 14 shown in FIG. 4) that may be selected as an item (winning item 12 shown in FIG. 4) given to the user as a result of playing the event, and a priority 720e. Detailed data (e.g., display model, texture, and setting value) about the item specified by the item ID 720b is included in the item setting data 705, and can be arbitrarily referred to based on the item ID 720b.

The preferential winning item setting data 722 includes the setting of the preferential winning item of each user in connection with the event. Specifically, the preferential winning item setting data 722 includes the setting of each candidate item selected in each friendship community.

For example, the preferential winning item setting data 722 includes a user ID 722a, and a preferential winning item ID 722b. The identification information stored as the item ID 720b of the candidate item setting data 720 is stored as the preferential winning item ID 722b.

Figure 12:
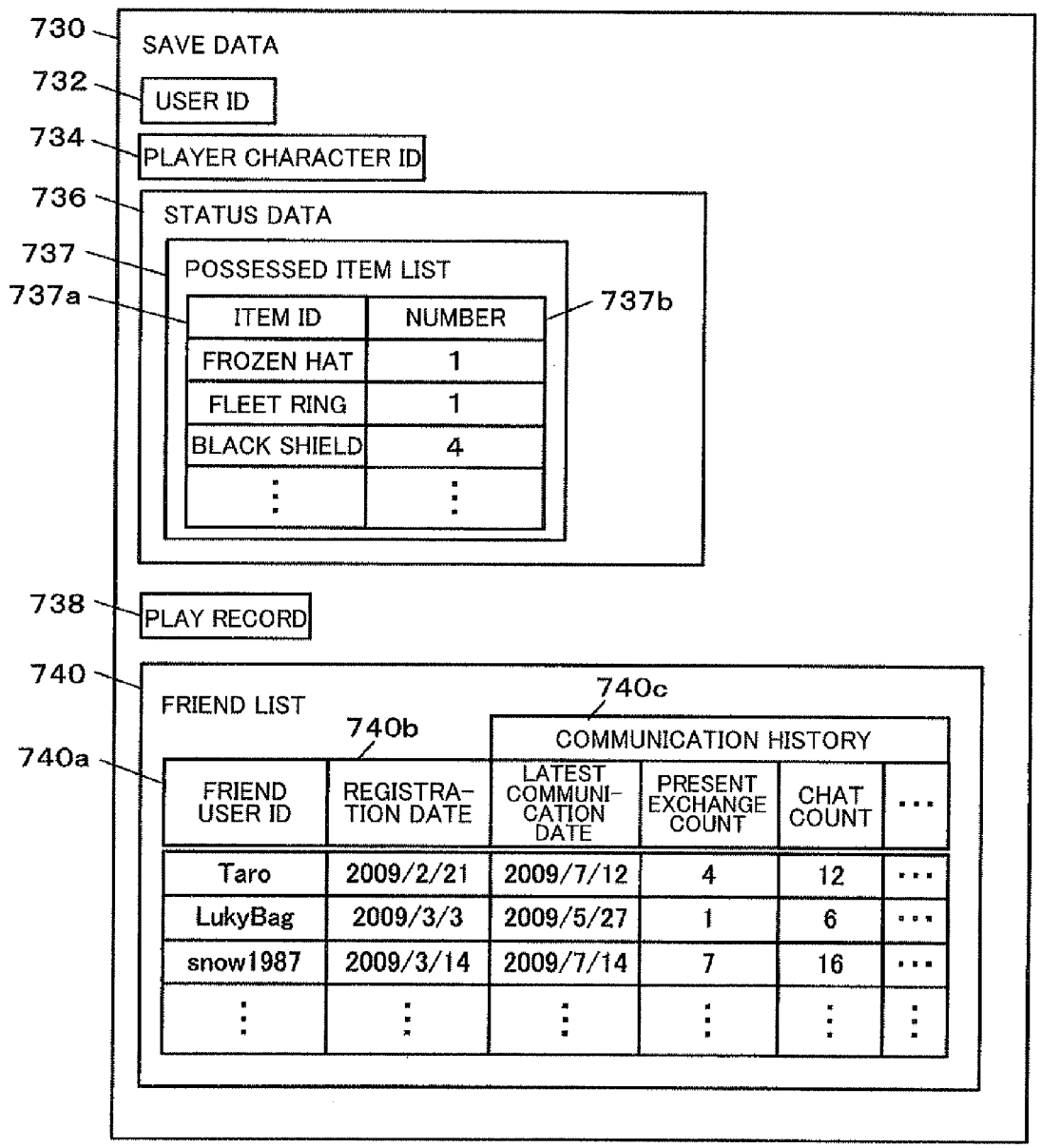
FIG. 12 is a view showing a data configuration example of save data.

The save data 730 (i.e., a data set provided corresponding to each user) includes the previous play data about the corresponding user. As shown in FIG. 12, the save data 730 includes a user ID 732, a player character ID 734, status data 736, a play record 738, and a friend list 740, for example.

The status data 736 includes information about the current status of the player character. For example, the status data 736 appropriately includes information about a hit point, money and the like, a possessed item list 737, an equipped item list, the current position, and the like. The state of the player character when the user logged out last time can be reproduced by reading the status data 736.

The possessed item list 737 includes an item ID 737a of an item currently possessed by the user, and a number 737b of items.

The play record 738 includes historical information about the main game and the event played by the user. For example, the play record 738 includes the main game play date, identification information about another user who played the main game with the user, identification information about a cleared event, and the like. The play record 738 may include historical information about communication between the users.

The friend list 740 includes registration information about a user registered as a friend user, and a record of communication with the registered user (friend user).

For example, the friend list 740 includes a friend user ID 740a, a registration date 740b, and a communication history 740c. The communication history 740c includes the latest communication date, the present exchange count, the chat count, and the like. The communication history 740c may appropriately include other parameters.

Functional Blocks of Portable Game Device

Figure 13:
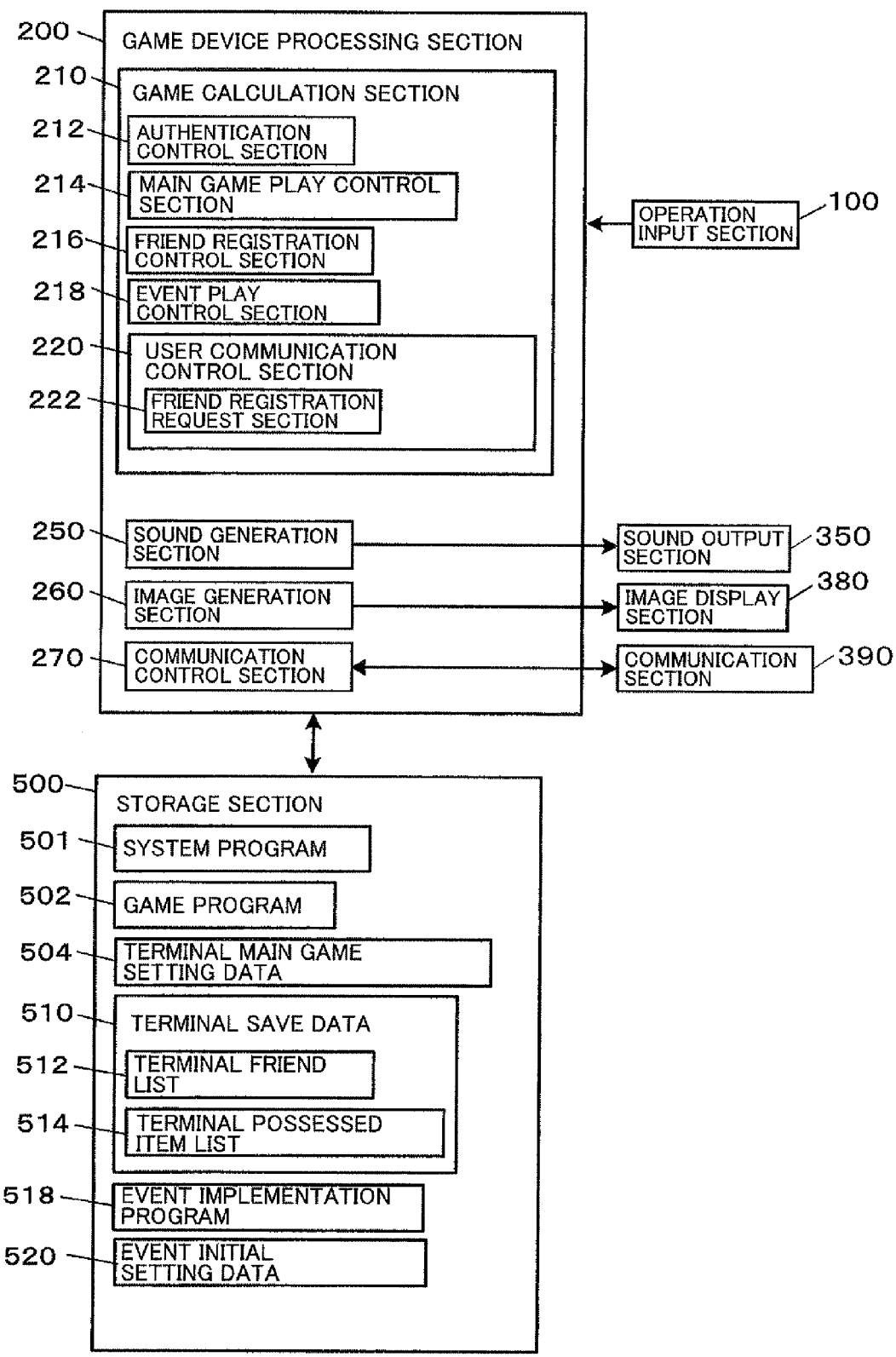
FIG. 13 is a functional block diagram showing an example of the functional configuration of a portable game device.

FIG. 13 is a functional block diagram showing an example of the functional configuration of the portable game device 1400 according to this embodiment. The portable game device 1400 includes an operation input section 100, a game device processing section 200, a sound output section 350, an image display section 380, a communication section 390, and a storage section 500.

The operation input section 100 is implemented by a button switch, a joystick, a touch pad, a trackball, an acceleration sensor unit, a tilt sensor unit, or the like. The operation input section 100 outputs an operation input signal to the game device processing section 200 based on an operation input performed by the player. The arrow key 1402, the button switches 1404, and the touch panels 1407 and 1409 shown in FIG. 1 correspond to the operation input section 100.

The game device processing section 200 is implemented by electronic components such as a processor (e.g., microprocessor), an application-specific integrated circuit (ASIC), and an IC memory. The game device processing section 200 exchanges data with each functional section (e.g., operation input section 100 and storage section 500) of the portable game device 1400. The game device processing section 200 controls the operation of the portable game device 1400 by performing various calculation processes based on a given program, data, and the operation input signal from the operation input section 100. In FIG. 2, the control unit 1450 included in the main body 1401 corresponds to the game device processing section 200.

The game device processing section 200 according to this embodiment includes a game calculation section 210, a sound generation section 250, an image generation section 260, and a communication control section 270. The game device processing section 200 also includes an authentication control section 212, a main game play control section 214, a friend registration control section 216, an event play control section 218, and a user communication control section 220.

The authentication control section 212 performs a process necessary for the user to access the server system 1100 for playing the main game or communicating with another player, and log in to the server system 1100 as a result of authentication using the user ID (e.g., account) acquired during registration. In this case, the authentication control section 212 displays an account/password input screen on the first liquid crystal display 1406 or the like, displays a software keyboard, and receives a text input by a touch operation, for example.

The main game play control section 214 performs a process that allows the user to play the main game in the game world provided by the server system 1100.

The event play control section 218 controls an event guide display, selects an event desired by the user, and transmits a participation request for the selected event to the server system 1100. The event play control section 218 stores an event implementation program 518 and event initial setting data 520 transmitted from the server system 1100 in the storage section 500, and executes the event implementation program 518 to implement the event in the portable game device 1400. The event play control section 218 transmits an event end signal to the server system 1100 when the event has ended, receives the latest possessed item list to which the winning item has been added, and displays it on the first liquid crystal display 1406. The event play control section 218 also performs other processes necessary for event play.

The user communication control section 220 performs a communication process that allows the user to have a chat with another user in the lobby, or give a present to another user, after completion of authentication. The user communication control section 220 includes a friend registration request section 222.

The friend registration request section 222 detects a given friend registration operation, and transmits a friend registration request to the server system 1100. For example, a screen that allows the user to input the identification information about the registration target user may be displayed on the first liquid crystal display 1406 or the like together with a software keyboard.

These user communication processes may be implemented by appropriately utilizing similar functions used in a known online game.

The sound generation section 250 is implemented by a processor (e.g., digital signal processor (DSP)) and a control program, for example. The sound generation section 250 generates sound signals of a game-related effect sound, background music (BGM), and an operation sound, and outputs the generated sound signals to the sound output section 350.

The sound output section 350 is a device that outputs sound (e.g., effect sound and BGM) based on the sound signals input from the sound generation section 250. In FIG. 2, the speaker 1410 corresponds to the sound output section 350.

The image generation section 260 is implemented by a processor (e.g., digital signal processor (DSP)), a control program, a drawing frame IC memory (e.g., frame buffer), and the like. The image generation section 260 generates one 3DCG image every frame time (e.g., 1/60th of a second), and outputs image signals of the generated image to the image display section 380.

The image display section 380 displays a game image based on the image signals input from the image generation section 260. The image display section 380 may be implemented by an image display device such as a flat panel display, a cathode-ray tube (CRT), a projector, or a head mount display. In FIG. 2, the first liquid crystal display 1406 and the second liquid crystal display 1408 correspond to the image display section 380.

The communication control section 270 performs a data communication process, and exchanges data with an external device via the communication section 390.

The communication section 390 connects to the communication line 1 at a physical level, and implements communication. The communication section 390 is implemented by a transceiver, a modem, a terminal adapter (TA), a jack for a communication cable, a control circuit, and the like. In FIG. 2, the wireless communication module 1412 corresponds to the communication section 390.

The storage section 500 stores a system program that causes the game device processing section 200 to control the portable game device 1400, a game program, data, and the like. The storage section 500 is used as a work area for the game device processing section 200, and temporarily stores the results of calculations performed by the game device processing section 200 based on a program, data input from the operation section 100, and the like. The function of the storage section 500 is implemented by an IC memory (e.g., RAM or ROM), a magnetic disk (e.g., hard disk), an optical disk (e.g., CD-ROM or DVD), or the like.

In this embodiment, the storage section 500 stores a system program 501, a games program 502 that causes the portable game device 1400 to access the server system 1100 and execute the main game, and terminal main game setting data 504 in advance.

The storage section 500 also stores terminal save data 510, the event implementation program 518, and event initial setting data 520 that are generated during the game, and appropriately updated. The storage section 500 may also appropriately store information (e.g., counter value, timer value, or flag) that is required for executing the game.

The game program 502 may be distributed as a package of an information storage medium (e.g., CD-ROM or DVD) that stores the game program 502, or may be downloaded via the communication line 1, and may be stored in the storage section 500 in advance.

The terminal main game setting data 504 is replicated data of the main game setting data 704 stored in the server system 1100.

The game program 502 and the terminal main game setting data 504 are automatically updated at an appropriate timing (e.g., during authentication) in the same manner as in a known online game.

The terminal save data 510 is complete or partial replicated data of the save data 730 (see FIG. 12) that is stored in the server system 1100 and corresponds to the user who uses the portable game device 1400, and is automatically updated at an appropriate timing (e.g., during authentication). The terminal save data 510 includes at least a terminal friend list 512 that is a duplicate of the friend list 740, and a terminal possessed item list 514 that is a duplicate of the possessed item list 737.

The event implementation program 518 and the event initial setting data 520 are necessary for the portable game device 1400 to implement an event transmitted from the server system 1100 in response to an event participation request.

Process Flow

Figure 14:
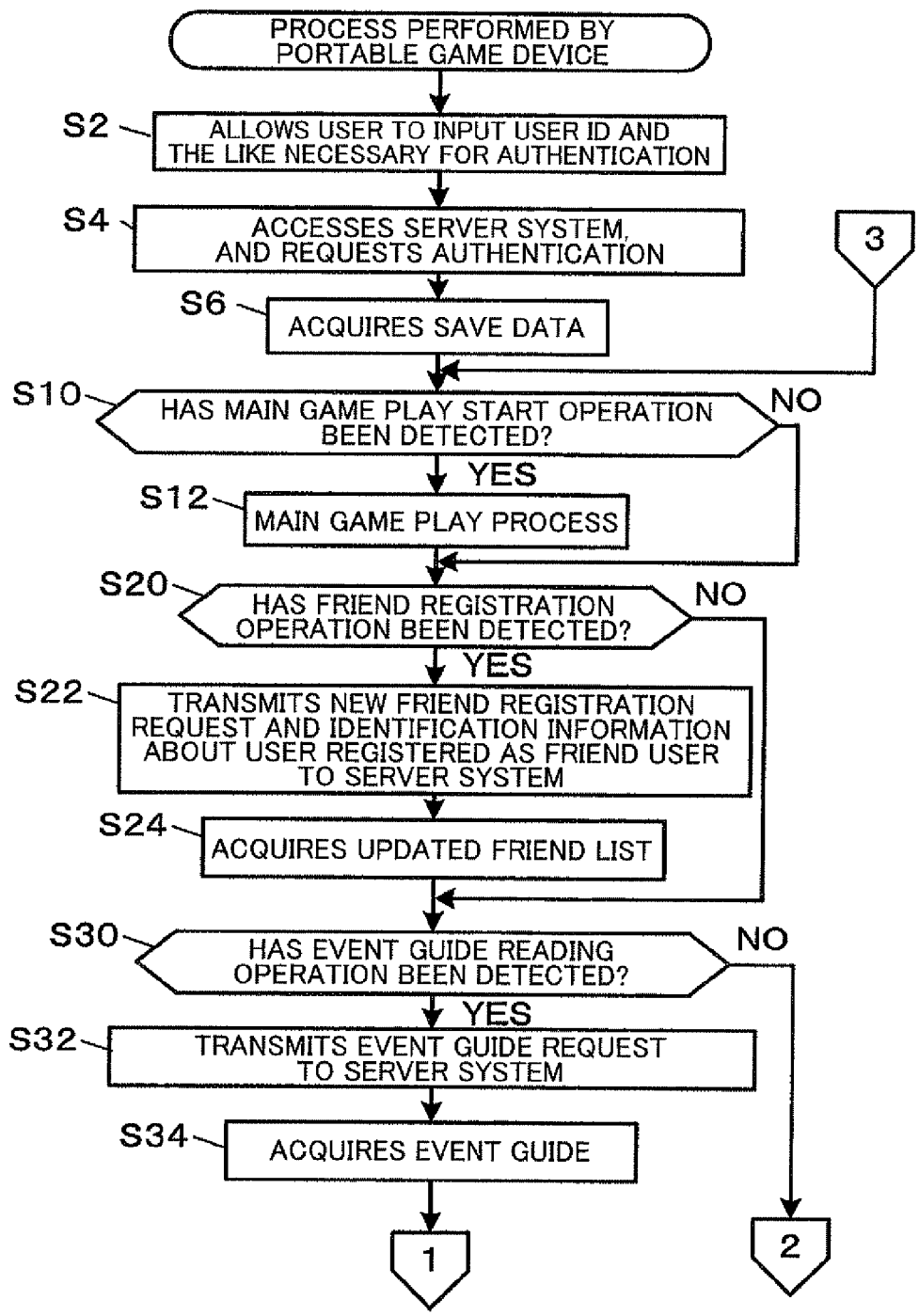
FIG. 14 is a flowchart illustrative of the flow of a process performed by a portable game device.

The flow of the process according to this embodiment is described below. The flow of the process performed by the portable game device 1400 is described below with reference to FIGS. 14 and 15. The following process is implemented by causing the game device processing section 200 to execute the game program 502.

The game device processing section 200 displays an authentication screen and a software keyboard on the first liquid crystal display 1406, and performs a process that allows the user to input the user ID (e.g., an account acquired during registration) and the password necessary for authentication (step S2). When the user has input the user ID and the like, the game device processing section 200 accesses the server system 1100, and requests authentication (step S4).

When the server system 1100 has completed authentication, the server system 1100 transmits the save data 730 corresponding to the input user ID. The game device processing section 200 stores the save data 730 transmitted from the server system 1100 in the storage section 500 as the terminal save data 510 (step S6).

When the game device processing section 200 has detected a given main game play start operation (YES in step S10), the game device processing section 200 performs the main game play process (step S12). The main game according to this embodiment is configured so that an RPG-type mission (e.g., dungeon capture, guard mission, or rescue mission) is selected from a plurality of candidates, and a single user or a party formed by a plurality of users plays the mission. The character of each user defeats an enemy (e.g., monster or wizard) using an item acquired during the game, and escapes from a trap to complete the mission, for example. The user gains acquaintance with another user as a result of playing the main game. When the user desires to deepen the friendship with another user, the user inputs the identification information (e.g., account) about the other user by performing a given friend registration operation after the main game has ended, so that the user whose identification information has been input is registered as a friend user.

Specifically, when the game device processing section 200 has detected a given friend registration operation after the main game has ended (YES in step S20), the game device processing section 200 transmits a new friend registration request and the identification information about the user who is registered as a friend user to the server system 1100 (step S22).

The server system 1100 updates the friend list 740 included in the save data 730 in response to the new friend registration request from the portable game device 1400, and transmits the updated friend list 740 to the portable game device 1400. The game device processing section 200 receives (acquires) the friend list 740, and stores the friend list 740 as the terminal friend list 512 included in the terminal save data 510 (step S24).

The game device processing section 200 allows the user to play an event (sub-game) for a limited time. When the game device processing section 200 has detected a given event guide reading operation (YES in step S30), the game device processing section 200 transmits an event guide information request to the server system 1100 (step S32).

Figure 15:
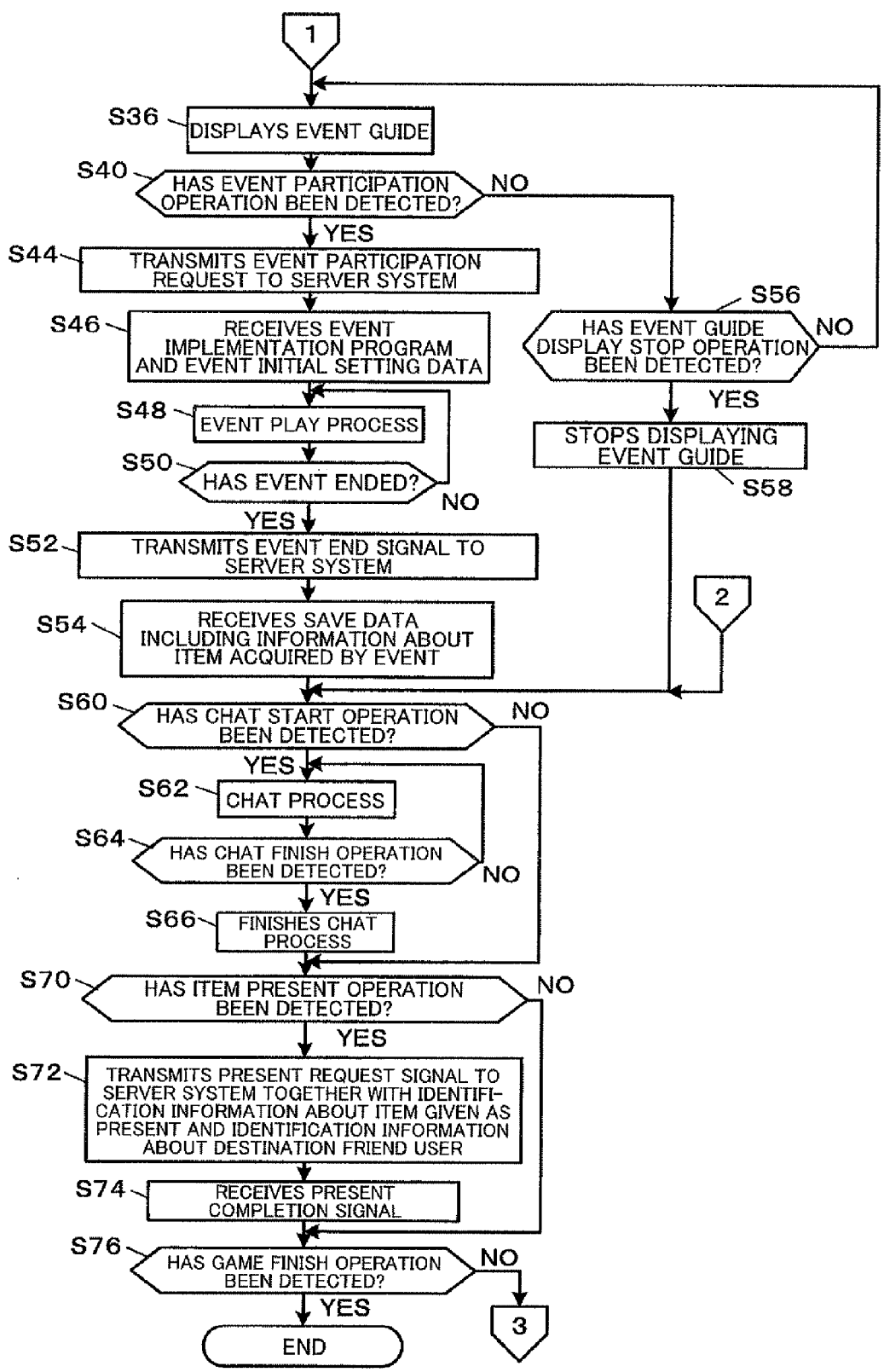
FIG. 15 is a flowchart that follows the flowchart shown in FIG. 14.

When the server system 1100 has received the event guide information request, the server system 1100 transmits the event guide data 708 to the portable game device 1400. The game device processing section 200 receives (acquires) the event guide data 708, and temporarily stores the event guide data 708 in the storage section 500 (step S34). The game device processing section 200 displays the acquired event guide on the first liquid crystal display 1406 or the like (step S36; FIG. 15).

The user can play the desired event by performing an event participation operation referring to the event guide.

When the game device processing section 200 has detected that an event participation operation has been input (YES in step S40), the game device processing section 200 transmits an event participation request including the event ID of the selected event to the server system 1100 (step S44).

When the server system 1100 has received an event participation request signal, the server system 1100 transmits the event implementation program 716 and the event initial setting data 718 of the requested event. The game device processing section 200 receives the event implementation program 716 and the event initial setting data 718, and temporarily stores the event implementation program 716 and the event initial setting data 718 in the storage section 500 as the event implementation program 518 and the event initial setting data 520 (step S46). This makes it possible for the user to play the event.

The game device processing section 200 executes the event implementation program 518 to implement event play (step S48). When the event has ended (YES in step S50), the game device processing section 200 transmits an event end signal to the server system 1100 (step S52).

When the server system 1100 has received the event end signal, the server system 1100 determines an item to give to the user of the portable game device 1400. Specifically, the server system 1100 determines an item acquired by the user. The server system 1100 adds the determined item to the possessed item list 737 included in the save data 730 about the user to update the possessed item list 737, and transmits the save data 730 including the updated possessed item list 737.

The game device processing section 200 receives the save data 730 including the possessed item list 737, and replaces the terminal save data 510 with the received save data 730 (step S54). In this case, the acquired item may be notified to the user.

When the game device processing section 200 does not detect an event participation operation in the step S40 (NO in step S40), the game device processing section 200 displays an event guide until the game device processing section 200 detects that an event guide display stop operation has been input (NO in step S56). When the game device processing section 200 has detected that an event guide display stop operation has been input (YES in step S56), the game device processing section 200 stops displaying the event guide (step S58).

In this embodiment, the user can enjoy a chat with the friend user by inputting a given chat start operation including a friend user selection operation.

When the game device processing section 200 has detected that a given chat start operation has been input (YES in step S60), the game device processing section 200 performs a chat process (step S62). When the game device processing section 200 has detected that a given chat finish operation has been input (YES in step S64), the game device processing section 200 finishes the chat process (step S66).

In this embodiment, the user can give an item to his friend user by inputting a given item present operation including a destination friend user designation operation and a present item designation operation.

When the game device processing section 200 has detected that a given item present operation has been input (YES in step S70), the game device processing section 200 transmits a present request signal to the server system 1100 together with the identification information about the item given as a present and the identification information about the destination friend user (step S72).

When the server system 1100 has received the present request signal, the server system 1100 adds the item to the possessed item list 737 of the destination friend user. The server system 1100 then transmits a present completion signal to the sender of the present request signal. When the game device processing section 200 has received the present completion signal, the game device processing section 200 notifies the user of reception of the present completion signal using the first liquid crystal display 1406 or the like (step S74).

When the game device processing section 200 has not detected a given game finish operation (NO in step S76), the game device processing section 200 returns to the step S10, and performs the above process.

When the game device processing section 200 has detected a given game finish operation (YES in step S76), the game device processing section 200 finishes the above process.

Figure 16:
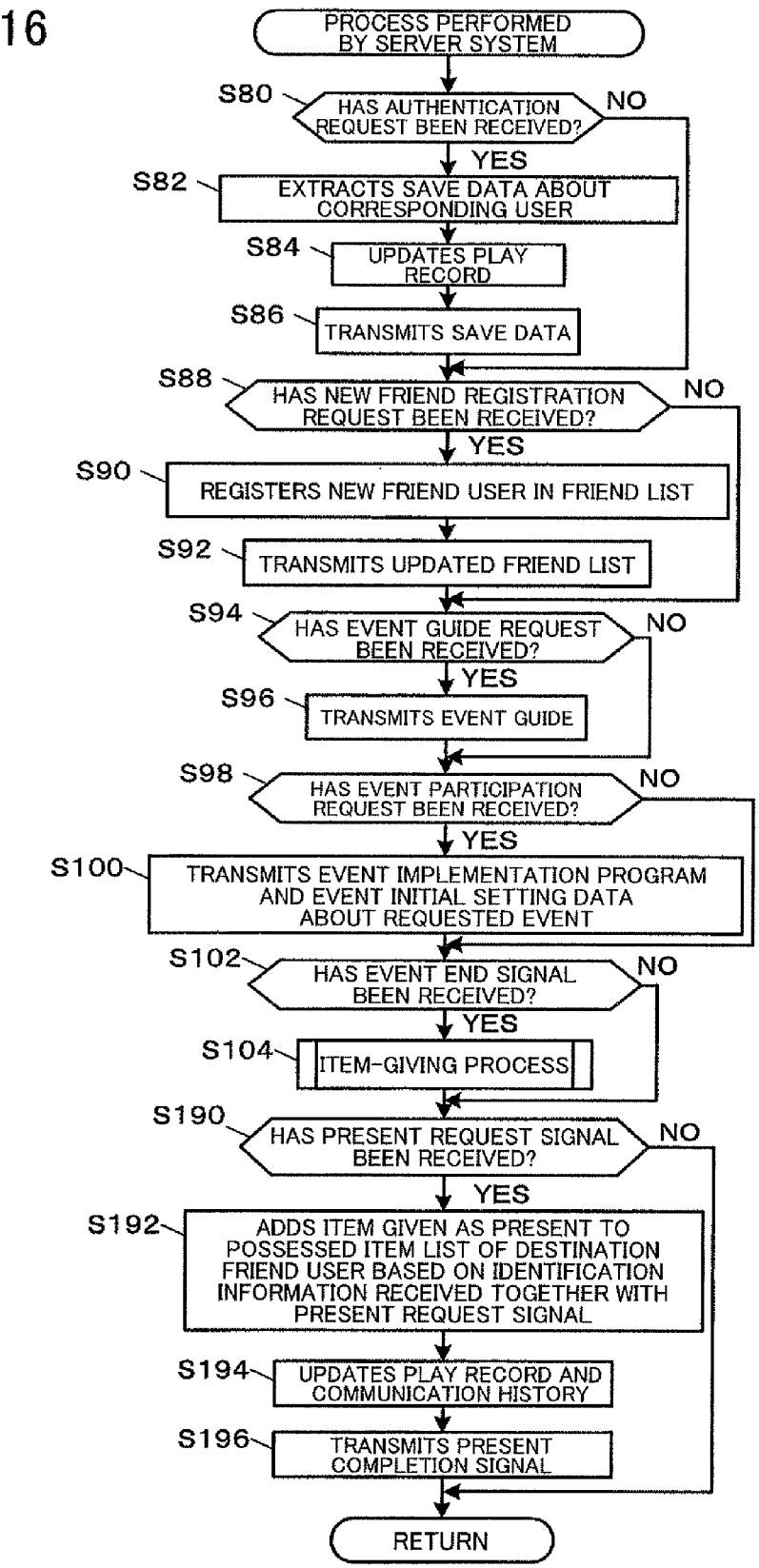
FIG. 16 is a flowchart illustrative of the flow of a process performed by a server system.

FIG. 16 is a flowchart illustrative of the flow of the main process performed by the server system 1100. The following process is implemented by causing the server processing section 400 to execute the game management program 702.

Note that the lobby function that allows the user to invite another user to play together, and the chat function may be implemented in the same manner as in a known online game. Therefore, description of the lobby function and the chat function is omitted. The item setting data 705, the event guide data 708, and the event setting data 710 are appropriately updated when the event has changed in the same manner as a setting data update operation used in a known online game. Therefore, description of the update process is omitted.

When the server processing section 400 has received an authentication request from the portable game device 1400 (YES in step S80), the server processing section 400 extracts the save data 730 about the corresponding user (step S82), and updates the play record 738 (step S84). The server processing section 400 transmits the latest save data 730 to the portable game device 1400 that has transmitted the authentication request (step S86). The save data 730 is appropriately set depending on the details of the main game. The server processing section 400 transmits at least the status data 736 including the possessed item list 737 and the friend list 740.

When the server processing section 400 has received a new friend registration request (YES in step S88), the server processing section 400 registers a new friend user in the friend list 740 based on the identification information about the registration target user included in the received signal (step S90), and transmits the updated friend list 740 to the portable game device 1400 that has transmitted the new friend registration request (step S92).

When the server processing section 400 has received an event guide request (YES in step S94), the server processing section 400 transmits the event guide data 708 to the portable game device 1400 that has transmitted the event guide request (step S96).

When the user has performed an event participation operation that selects the desired event based on the event guide, the portable game device 1400 transmits an event participation request.

When the server system 1100 has received the event participation request (YES in step S98), the server processing section 400 selects the event setting data 710 about the requested event, and transmits the event implementation program 716 and the event initial setting data 718 (step S100). The user who has desired to participate in the event can thus play the event using the portable game device 1400. When the event has ended, the portable game device 1400 transmits an event end signal.

When the server system 1100 has received the event end signal (YES in step S102), the server processing section 400 selects a winning item from the candidate items of the event corresponding to the event end signal, and gives the winning item to the user who has played the event (item-giving process) (step S104).

Figure 17:
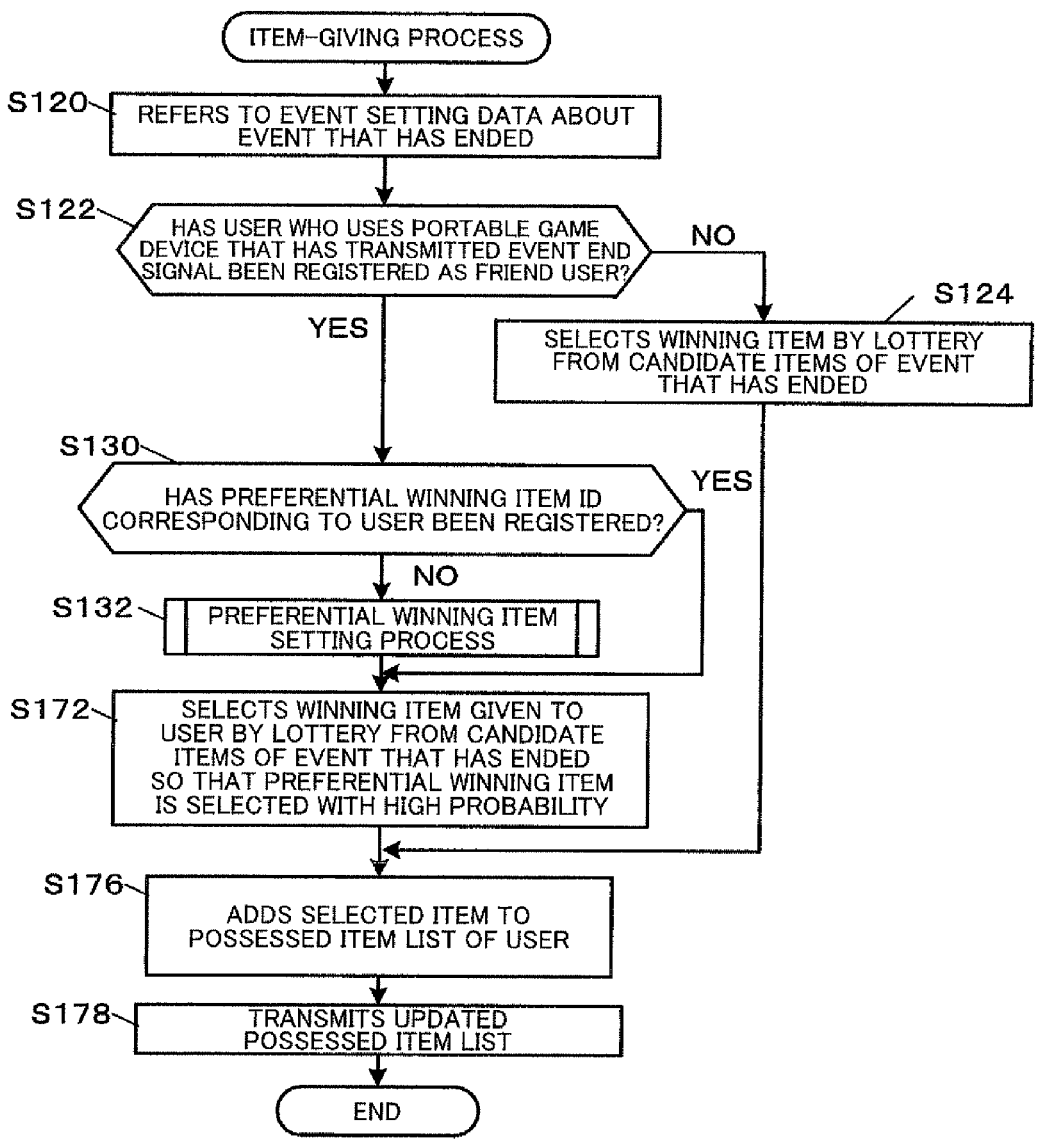
FIG. 17 is a flowchart illustrative of the flow of an item-giving process.

FIG. 17 is a flowchart illustrative of the flow of the item-giving process according to this embodiment. The server processing section 400 refers to the event setting data 710 about the event that has ended (step S120), and determines whether or not the user who uses the portable game device 1400 that has transmitted the event end signal has registered as a friend user (step S122). The server processing section 400 determines that the user has not registered a friend user when no friend user is registered in the friend list 740, and determines that the user has registered a friend user when a friend user is registered in the friend list 740.

When the server processing section 400 has determined that the user has not registered a friend user (NO in step S122), the server processing section 400 determines that communication with a friend user is not affected by the winning item, and selects the winning item by a lottery from the candidate items set in the candidate item setting data 720 (step S124). In this case, a random lottery may be employed since a given item need not be preferentially selected.

The server processing section 400 adds the selected item to the possessed item list 737 of the user (step S176), transmits the updated possessed item list 737 to the portable game device 1400 that has transmitted the event end signal (step S178), and finishes the item-giving process.

When the server processing section 400 has determined that the user who uses the portable game device 1400 that has transmitted the event end signal has registered a plurality of friend users (YES in step S122), the server processing section 400 refers to the preferential winning item setting data 722 about the event that has ended, and determines whether or not the preferential winning item ID 722b corresponding to the user has been registered (step S130).

When the server processing section 400 has determined that the preferential winning item ID 722b corresponding to the user has been registered (NO in step S130), the server processing section 400 performs a preferential winning item setting process (step S132).

Figure 18:
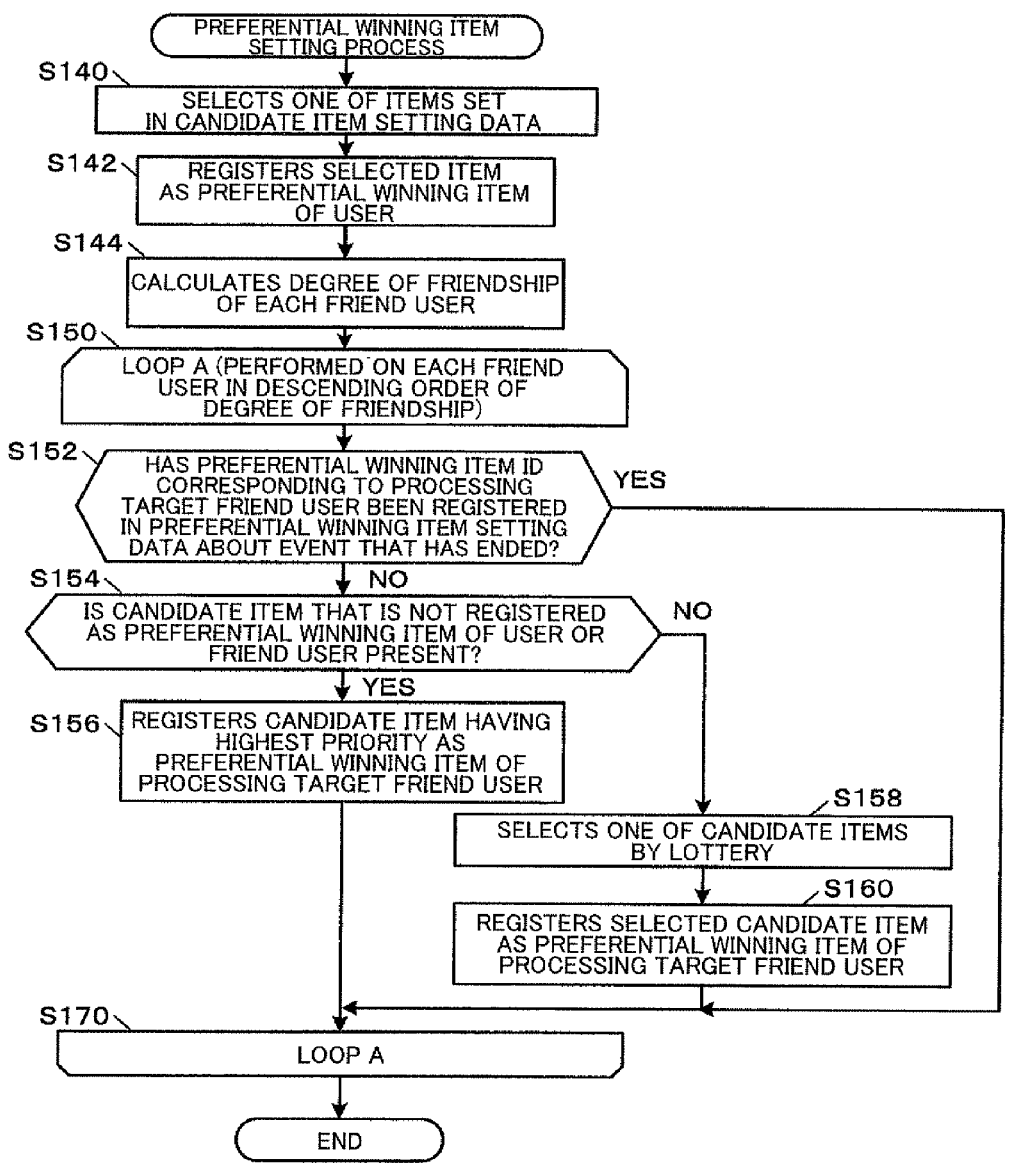
FIG. 18 is a flowchart illustrative of the flow of a preferential winning item setting process.

FIG. 18 is a flowchart illustrative of the flow of the preferential winning item setting process according to this embodiment.

In the preferential winning item setting process, the server processing section 400 sets a preferential winning item of the user who uses the portable game device 1400 that has transmitted the event end signal. Specifically, the server processing section 400 selects one of the items set in the candidate item setting data 720 (step S140), and registers the selected item in the preferential winning item setting data 722 as the preferential winning item of the user (step S142). The item may be selected by a random lottery from all of the items set in the candidate item setting data 720, or may be selected by a random lottery from the items within a given priority range.

The server processing section 400 then refers to the friend list 740 of the user, and calculates the degree of friendship of each registered friend user (step S144). In this embodiment, the degree of friendship is set so that a friend user who frequently has a chat with the user or gives a present to the user has a high degree of friendship. Therefore, the degree of friendship is calculated by calculating a base value from the sum of the chat count and the present exchange count, and multiplying the base value by a coefficient that increases as the elapsed time from the latest communication (e.g., play or chat) date decreases, and decreases as the elapsed time from the latest communication date increases, for example. Note that the degree of friendship may be appropriately calculated depending on the type of user communication.

The server processing section 400 then performs a loop A process on each friend user in descending order of the degree of friendship calculated as described above, and sets the preferential winning item of each friend user (steps S150 to S170). In the loop A process, the server processing section 400 refers to the preferential winning item setting data 722 about the event that has ended, and determines whether or not the preferential winning item ID 722b corresponding to the user ID 722a of the processing target friend user has been registered (step S152).

When the server processing section 400 has determined that the preferential winning item ID 722b corresponding to the user ID 722a of the processing target friend user has been registered (YES in step S152), the server processing section 400 finishes the loop A process on the processing target friend user (step S170).

When the server processing section 400 has determined that the preferential winning item ID 722b corresponding to the user ID 722a of the processing target friend user has not been registered (NO in step S152), the server processing section 400 refers to the preferential winning item setting data 722, and extracts an unregistered candidate item that has not been registered as the preferential winning item of the user who uses the portable game device 1400 that has transmitted the event end signal, or the preferential winning item of the friend user. Specifically, the server processing section 400 extracts a candidate item that is not registered as the preferential winning item.

When the server processing section 400 has extracted an unregistered candidate item (YES in step S154), the server processing section 400 selects a candidate item having the highest priority 720c, registers the selected candidate item as the preferential winning item of the processing target friend user (step S156), and finishes the loop A process (step S170).

If the server processing section 400 could not extract an unregistered candidate item (NO in step S154), the server processing section 400 selects one of the candidate items set in the candidate item setting data 720 by a random lottery (step S158), registers the selected candidate item as the preferential winning item of the processing target friend user in the event that has ended (step S160), and finishes the loop A process (step S170).

When the server processing section 400 has performed the loop A process on all of the friend users, the server processing section 400 finishes the preferential winning item setting process, and returns to the flowchart shown in FIG. 17.

The server processing section 400 then selects a winning item given to the user who uses the portable game device 1400 that has transmitted the event end signal by a lottery (step S172). The winning item is selected from the candidate items of the event that has ended so that the preferential winning item of the user is selected with high probability.

The server processing section 400 adds the selected item to the possessed item list 737 of the user (step S176), transmits the updated possessed item list 737 to the portable game device 1400 that has transmitted the event end signal (step S178), and finishes the item-giving process.

When the server processing section 400 has determined that the preferential winning item of the user who uses the portable game device 1400 that has transmitted the event end signal has been registered (YES in step S130), the server processing section 400 skips the preferential winning item setting process, performs the winning item lottery process (step S172), adds the item to the possessed item list 737 (step S176), transmits the possessed item list 737 (step S178), and finishes the item-giving process.

Again referring to the flowchart shown in FIG. 16, when the server processing section 400 has received a present request signal (YES in step S190), the server processing section 400 adds the item given as a present to the possessed item list 737 of the destination friend user based on the identification information about the destination friend user and the identification information about the item given as a present that have been received together with the present request signal (step S192). In this case, the item given as a present may be deleted from the possessed item list 737 of the user, or may not be deleted from the possessed item list 737 of the user (i.e., a duplicate is given as a present).

The server processing section 400 then updates the play record 738 of the user and the communication history 740c of the friend list 740 (step S194), and transmits a present completion signal to the portable game device 1400 that has transmitted the present request signal (step S196).

The server processing section 400 repeatedly performs the above process.

According to this embodiment, the type of item preferentially acquired differs between a reference user and a friend user of the reference user. Specifically, each of the reference user and the friend user can acquire a given item, but cannot easily acquire an item possessed by another user. Therefore, each of the reference user and the friend user must ask his friend to hand over the item in order to acquire an item other than the item that can be preferentially acquired by each user. When the user possesses a plurality of identical items, the user would willingly give one of the items to his friend as a present when asked by his friend. In this ease, the user may be offered an item that is not possessed by the user.

This makes it possible to promote communication between the users by utilizing exchange of items.

The embodiments to which the invention is applied have been described above. Note that the invention is not limited thereto. Various modifications may be appropriately made, such as adding other elements, omitting some of the elements, or changing some of the elements.

First Modification

Figure 19:
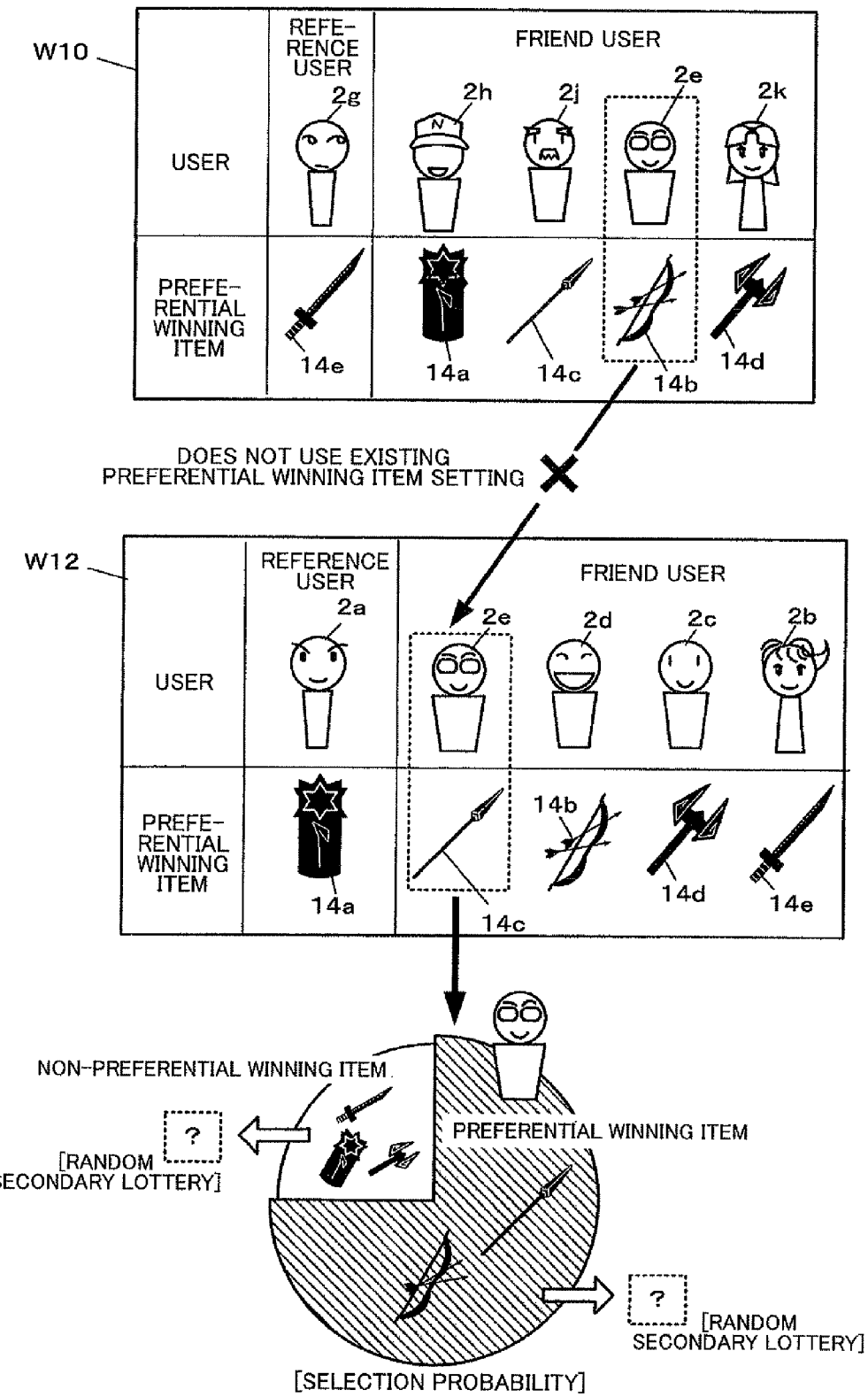
FIG. 19 is a schematic view illustrative of a configuration in which a plurality of preferential winning items can be set to each user.

The above embodiments have been described taking an example in which one preferential winning item is set to each user. Note that a plurality of preferential winning items may be set to each user. In the example shown in FIG. 19, the friend user 2e of the reference user 2a is also a friend user of a reference user 2g, and a preferential winning item (14b) has been set to the friend user 2e as a friend user of the reference user 2g. In the above embodiments, the preferential winning item is set to each friend user of the reference user 2a when setting the preferential winning item of the reference user 2a, and the existing setting is used when setting the preferential winning item to each friend user of the reference user 2a. However, the preferential winning item may be set without using the existing setting. In the example shown in FIG. 19, the bow 14b and the halberd 14c are set to the friend user 2e as the preferential winning items.

Figure 20:
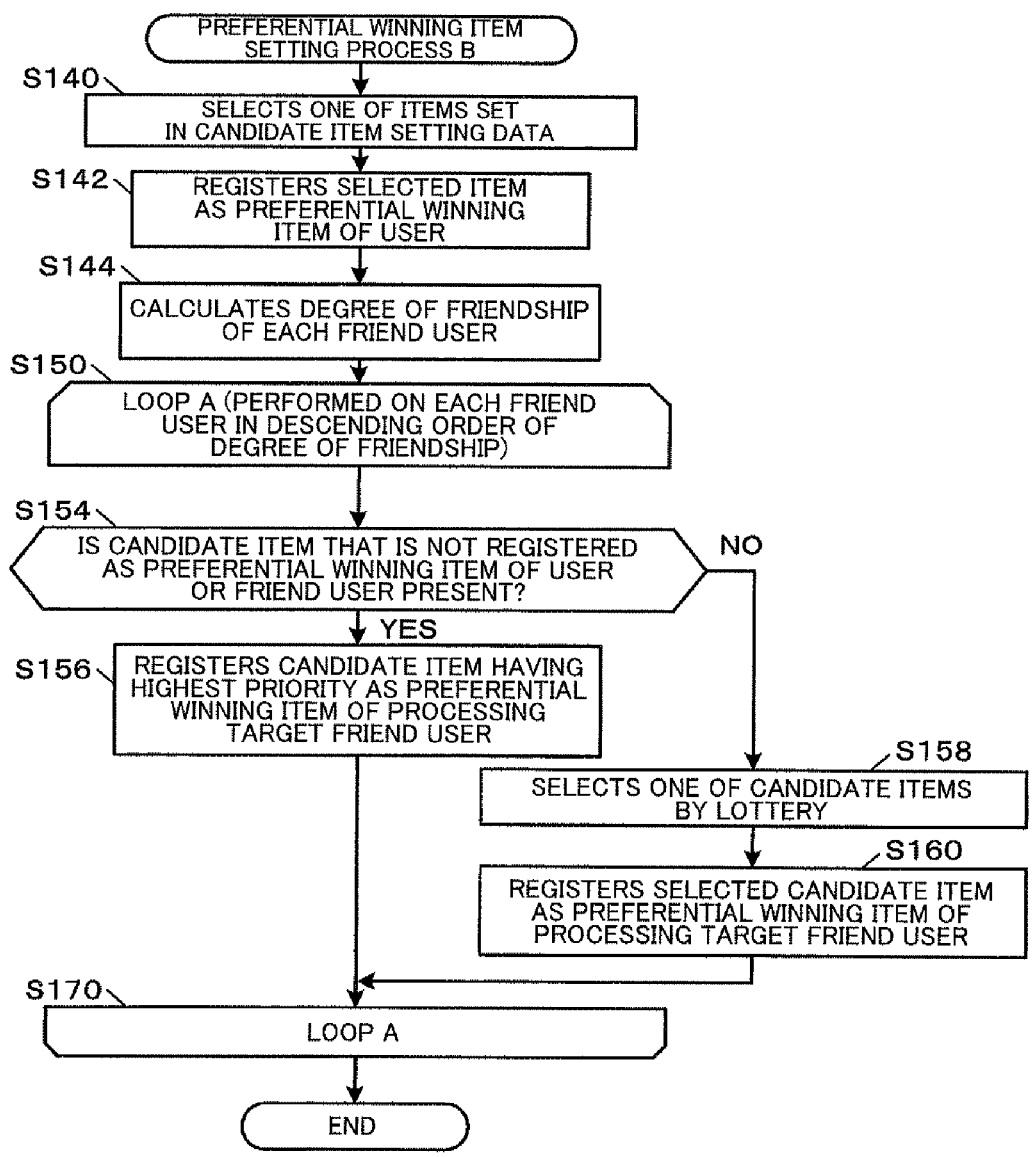
FIG. 20 is a flowchart illustrative of the flow of a preferential winning item setting process (preferential winning item setting process B) when a plurality of preferential winning items can be set to each user.

FIG. 20 is a flowchart illustrative of the flow of the preferential winning item setting process (preferential winning item setting process B) when a plurality of preferential winning items can be set to each user. The flow of the preferential winning item setting process B is basically the same as that of the above preferential winning item setting process, but differs from the above preferential winning item setting process in that the step S152 is omitted. When the preferential winning item setting process B is performed in a state in which the preferential winning item of the event is not registered for the user (reference user) who has participated in the event using the portable game device 1400 that has transmitted the event end signal, the step S156 or S158 is performed so that a new preferential winning item is set. Specifically, a plurality of items are registered as the preferential winning items instead of using the existing setting of the preferential winning item.

When a plurality of items may be registered as the preferential winning items, the item-giving process also differs from the above item-giving process.

Figure 21:
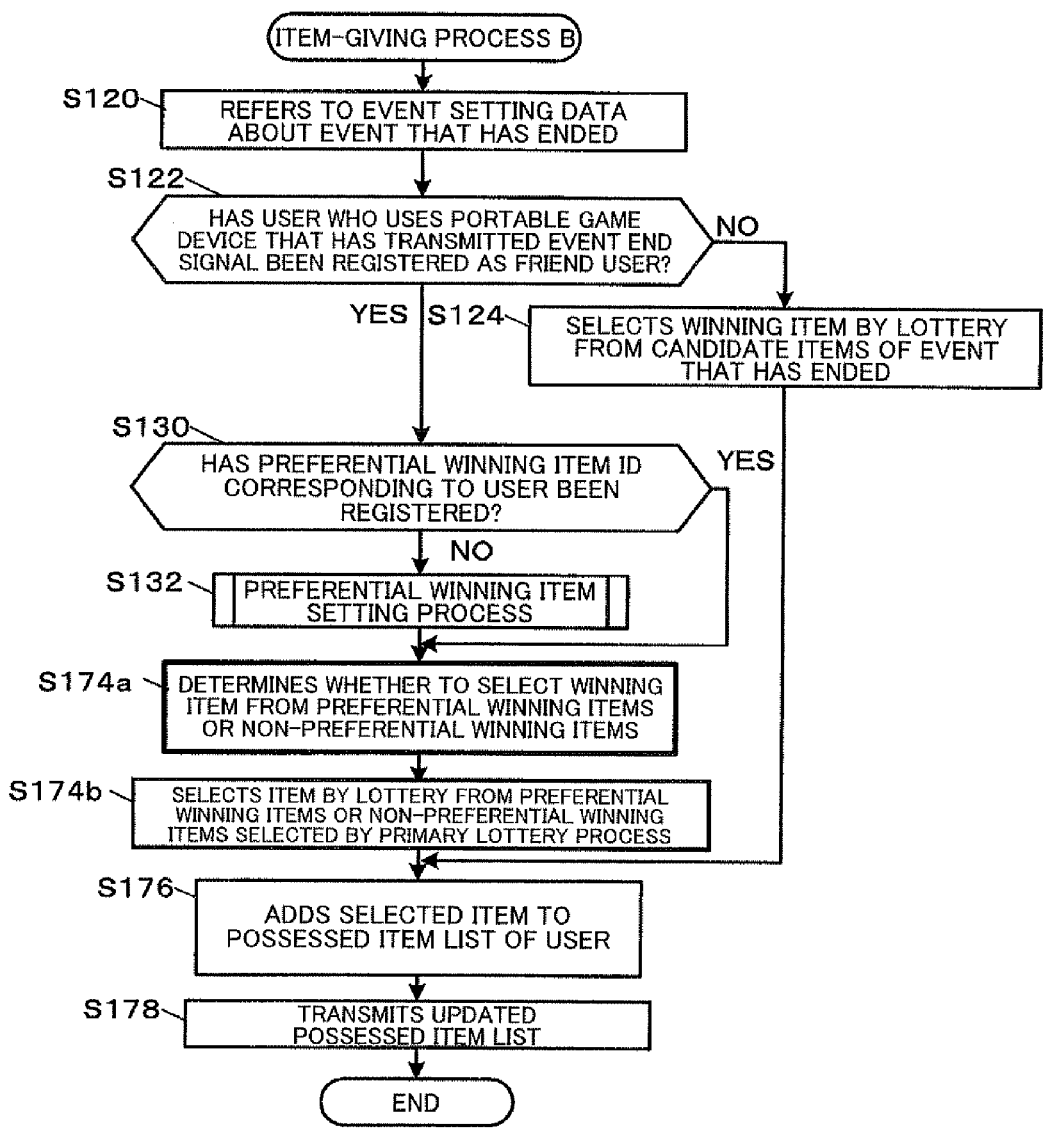
FIG. 21 is a flowchart illustrative of the flow of an item-giving process (item-giving process B) when a plurality of preferential winning items can be set to each user.

As shown in FIG. 21, the item-giving process (item-giving process B) according to the first modification includes a step S174a instead of the step S172. In the step S174a, the server processing section 400 performs a primary lottery process that determines whether to select the winning item from the preferential winning items or the non-preferential winning items. The primary lottery process is performed using a biased win probability so that the winning item is selected from the preferential winning items with a high probability (e.g., 80%). The server processing section 400 selects by a random lottery one of the candidate items that fall under the preferential winning items or the non-preferential winning items selected by the primary lottery process (step S174b), and registers the selected candidate item as the winning item (step S176).

Second Modification

The above embodiments have been described taking an example in which the preferential winning item of the reference user 2a is selected by a random lottery, and the preferential winning items are set to the friend users 2b to 2e based on the priority assigned to each candidate item 14 in advance. Note that the invention is not limited thereto.

As shown in FIG. 22, a parameter value change setting 720e is set as the candidate item setting data 720 instead of the priority 720c, for example. The parameter value change setting 720e defines a change in internal parameter value that is made when each character 4 ("armored soldier", "assault soldier", "horse soldier", . . . in FIG. 22) that can be used by user in the main game is equipped with each item. Specifically, the parameter value change setting 720e defines the effect of each item.

Figure 23:
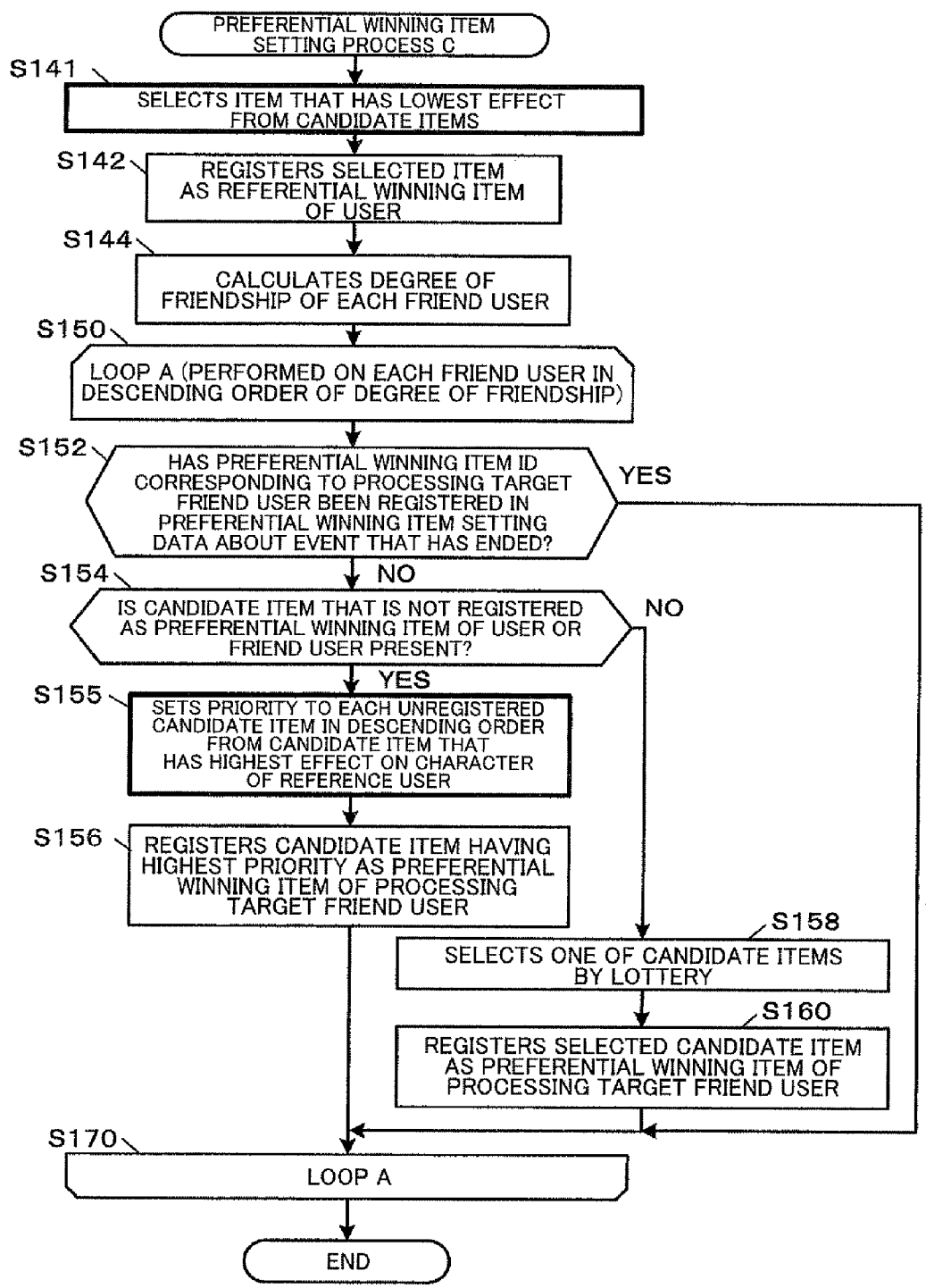
FIG. 23 is a flowchart illustrative of the flow of a preferential winning item setting process according to a modification.

As shown in FIG. 23, the flow of a preferential winning item setting process C according to the second modification is basically the same as that of the above preferential winning item setting process, but differs from the above preferential winning item setting process in that a step S141 is provided instead of the step S140. In the step S141, the server processing section 400 selects an item that has the lowest effect on the character of the user who uses the portable game device 1400 that has transmitted the event end signal.

After the step S154, the server processing section 400 sets a priority to each unregistered candidate item in descending order from a candidate item that has the highest effect on the character of the reference user (step S155).

According to this configuration, an item that is of small value for the user is mainly given to the user who has played the event, and an item that is of large value for the user is given to the friend user of the user. This further promotes communication between the users by promoting exchange of items between the users.

Note that the item selected in the step S141 need not necessarily be limited an item that has the lowest effect, but may be randomly selected from items excluding a given number of items having a high effect (e.g., items having a third and lower effect).

Third Modification

The above embodiments have been described taking an example in which the preferential winning items are set to the reference user 2a and the friend users 2b to 2e of the reference user 2a based on the latest friend list 740. Note that the invention is not limited thereto.

Figure 24:
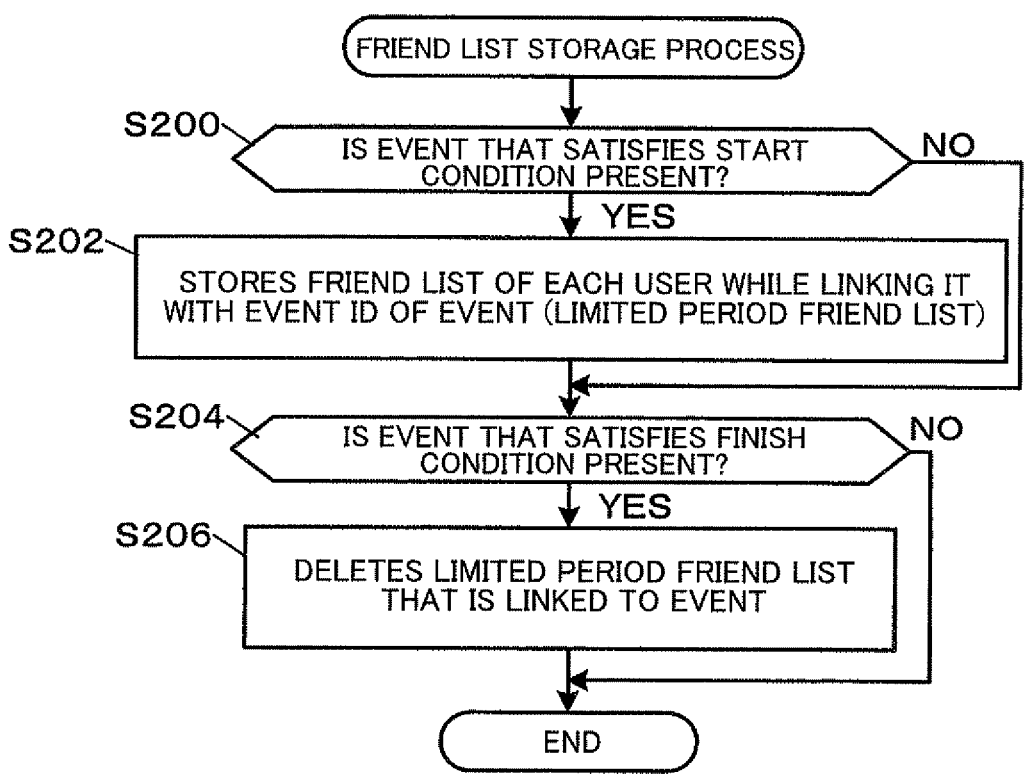
FIG. 24 is a flowchart illustrative of the flow of a friend list storage process.

For example, a friend list storage process shown in FIG. 24 may be added to the flow of the process (FIG. 16) performed by the server system. A special friend list (limited period friend list) that is referred to when setting the preferential winning item may be generated by reproducing the friend list 740 before the event starts, and temporarily stored. The limited period friend list may be referred to in the item-giving process instead of the friend list 740.

Specifically, the server processing section 400 determines whether or not an event that satisfies a start condition is present referring to the event setting data 710 (step S200). When the server processing section 400 has determined that an event that satisfies the start condition is present (YES in step S200), the server processing section 400 reproduces the friend list 740 of each user while linking it with the event ID 712 of the event (see FIG. 11), and stores the reproduced friend list in the storage section 700 as the limited period friend list (step S202). When the server processing section 400 has determined that an event that satisfies a finish condition is present (YES in step S204), the server processing section 400 deletes the limited period friend list that is linked to the event (step S206).

Fourth Modification

The above embodiments have been described taking an example in which a single server system 1100 provides the entire service including the main game and user communication. Note that the invention is not limited thereto.

Figure 25:
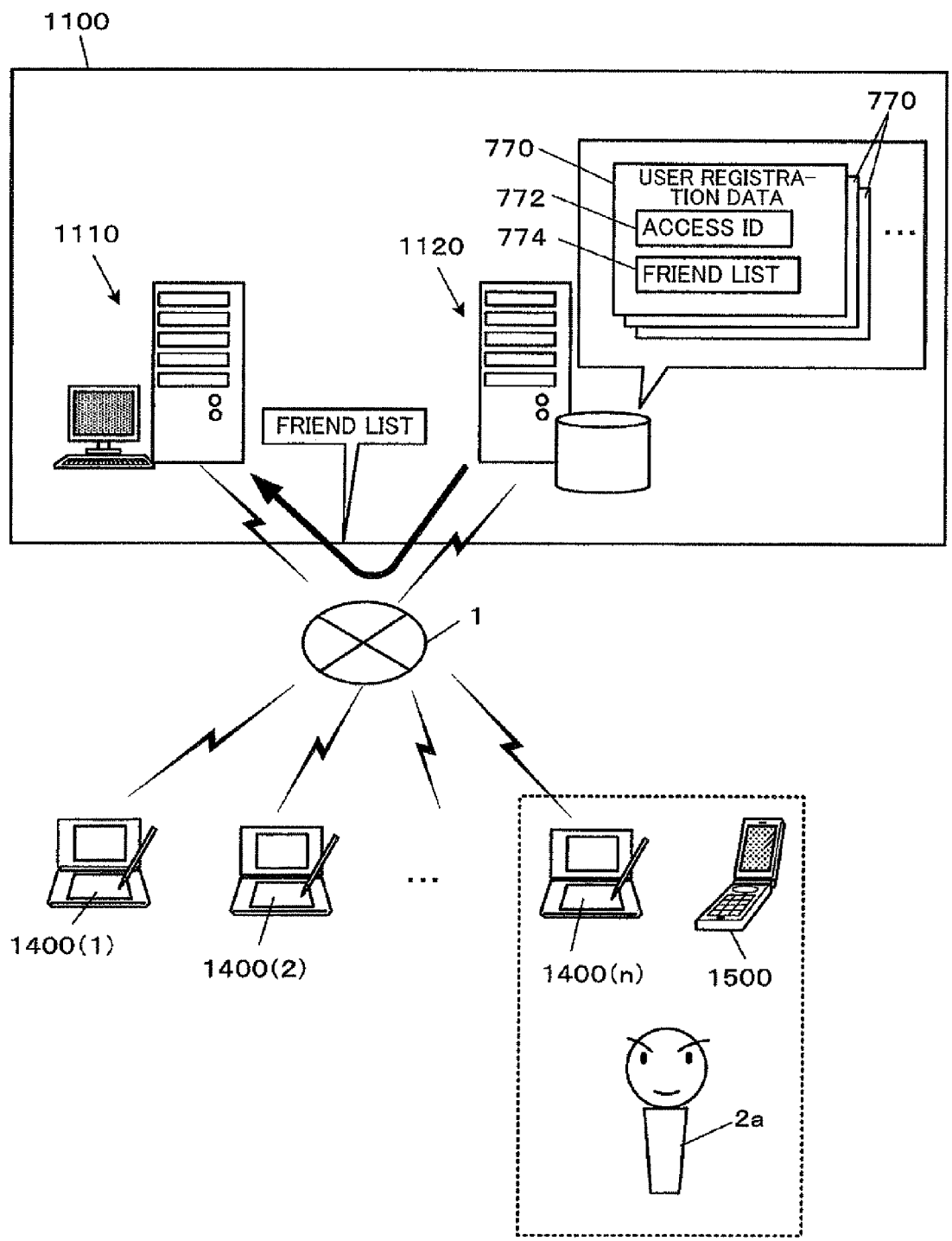
FIG. 25 is a view showing a system configuration according to a modification.

As shown in FIG. 25, the server functions relating to user registration, main game play, event play, and the present function may be implemented by a game server system 1110, and the server functions relating to user communication excluding the present function may be implemented by a social networking site (SNS) server system 1120. Specifically, the game server system may be implemented by the game server system 1110 and the SNS server system 1120.

The game server system 1110 and the SNS server system 1120 are implemented by hardware similar to that of the server system 1100, but differ from the server system 1100 as to the server functions in charge.

The user enjoys the main game or event play by accessing the game server system 1110 using the portable game device 1400. The user accesses the SNS server system 1120 using a mobile phone 1500 or the like having a web browser function, and enjoys a chat with another user registered as a friend.

The game server system 1110 also receives information (registration information) (e.g., access ID 772 and password) for accessing the SNS server system 1120 from the user from the user during user registration.

The game server system 1110 acquires the friend list 774 included in the user registration data 770 possessed by the SNS server system 1120 based on the access ID 772 when performing the item-giving process.

Other Modifications

The above embodiments have been described taking an example in which an item is given to the user when the user has played the event. Note that the item-giving condition is not limited to event play. For example, an item may be given to the user when the user has input an identification code acquired from a given website, a web magazine, a free gift card, or the like. In this case, the item-giving section 422 is provided outside the event management section 420 (see FIG. 9).

The above embodiments have been described taking an example in which the friend registration function, the chat function, and the present function are implemented as part of the lobby function. Note that the friend registration function, the chat function, and the present function may be implemented within the main game in the same manner as a known online game. In this case, the friend registration management section 426, the chat control section 428, and the present control section 430 are included in the main game play management section 416 (see FIG. 9).

The above embodiments have been described taking an example in which the number Y of friend users is larger than the number X of candidate items of the event. Note that the number X of candidate items of the event may be equal to or larger than the number Y of friend users. The number X of candidate items of the event may be equal to or larger than the total number of users. In this case, a specific preferential winning item can be set to each user. Specifically, since the number of items that can be acquired by the user increases in proportion to the number of users registered as a friend, it is possible to promote communication between a larger number of users by promoting friend registration.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. An item management method that is implemented by a server system connected to a terminal device via a communication line, the terminal device allowing a user to play a game, the item management method comprising:

selecting a high-probability item that differs between one user and a friend user, the one user and the friend user each having a profile storing information on at least one high probability item associated with the one user or the friend user, the friend user being registered as friends by the one user, and the high-probability item being selected is an item already owned by the one user and which is not currently owned by the friend user;

detecting whether or not a game situation of the game played by a game execution user has satisfied an item-giving condition, the game execution user being the one user or the friend user who are playing the game;

selecting an item from a plurality of items that include the high-probability item based on a lottery, the lottery assigning a win probability for the high-probability item linked to the game execution user to be higher than a win probability of other items in the plurality of items;

giving the item selected by the lottery to the game execution user;

managing a given item and a number of given items for each of the one user and the friend user; and transferring an item that has been given between the one user and the friend user in response to an item transfer request from the terminal device or a user terminal, at least one of the selecting of the high-probability item, the detecting, the selecting of the item by the lottery, the giving, the managing, and the transferring being performed by a hardware processor.

2. The item management method as defined in claim 1, further comprising:

changing a degree of friendship of each of the friend users of the one user with the one user based on a process of the game; and setting a priority to each item, wherein the selecting of the high-probability item includes selecting the high-probability item linked to each of the friend users of the one user based on the degree of friendship of the friend users with the one user and the priority of each item.

3. The item management method as defined in claim 2, further comprising:

performing a given communication control process for communication between users; and storing a history of communication between users through the communication control process, the changing of the degree of friendship including changing the degree of friendship of each friend user of the one user with the one user using the history of communication between the one user and each friend user of the one user.

4. The item management method as defined in claim 1, further comprising:

setting preferential items of each user, wherein the selecting of the high-probability item includes performing a primary lottery process that determines whether or not to select the high-probability item from the preferential items selected for each user, and a secondary lottery process that selects the high-probability item from the preferential items when it has been determined to select the high-probability item as a result of the primary lottery process.

5. The item management method as defined in claim 1, further comprising:

setting a priority to each item.

6. The item management method of claim 1, wherein the selecting of the item by the lottery includes setting the win probability of the high-probability item to be significantly higher than the win probability of other items.

7. The item management method of claim 6, wherein the selecting of the item by the lottery further includes setting the win probability of the high-probability item to be at least three times as high as the win probability of other items.

8. The item management method of claim 1, wherein the selecting of the item by the lottery is performed irrespective of whether the game execution user has possessed an identical high-probability item.

9. A server system connected to a terminal device via a communication line, the terminal device allowing a user to play a game, the server system comprising:
- a selection section that selects a high-probability item that differs between one user and a friend user, the one user and the friend user each having a profile storing information on at least one high probability item associated with the one user or the friend user, the friend user being registered as friends by the one user, and the high-probability item being selected is an item already owned by the one user and which is not currently owned by the friend user;
- a detection section that detects whether or not a game situation of the game played by a game execution user has satisfied an item-giving condition, the game execution user being the one user and the friend user who are playing the game;
- a lottery section that selects an item from a plurality of items that include the high-probability item based on a lottery, the lottery assigning a win probability for the high-probability item linked to the game execution user to be higher than a win probability of other items in the plurality of items;
- a giving section that gives the item selected by the lottery section to the game execution user;
- a management section that manages a given item and a number of given items for each of the one user and the friend user; and
- an item transfer section that transfers an item that has been given between the one user and the friend user in response to an item transfer request from the terminal device or a user terminal.

10. The server system of claim 9, wherein the lottery section selects the item by the lottery irrespective of whether the game execution user has possessed an identical high-probability item.

* * * * *